(12) United States Patent
Zhang et al.

(10) Patent No.: US 12,621,819 B2

(45) Date of Patent: *May 5, 2026

(54) BACKSCATTERING AMBIENT ISM BAND SIGNALS

(71) Applicant: The Board of Trustees of the Leland Stanford Junior University, Stanford, CA (US)

(72) Inventors: Pengyu Zhang, Palo Alto, CA (US); Dinesh Bharadia, Menlo Park, CA (US); Sachin Katti, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,406

(22) Filed: Sep. 7, 2022

(65) Prior Publication Data

US 2023/0103390 A1 Apr. 6, 2023

Related U.S. Application Data

(63) Continuation of application No. 16/344,983, filed as application No. PCT/US2017/058371 on Oct. 25, 2017, now Pat. No. 11,483,836.

(Continued)

(51) Int. Cl.
*H04W 72/044* (2023.01)
*H04B 1/00* (2006.01)
(Continued)

(52) U.S. Cl.
CPC ...... *H04W 72/0466* (2013.01); *H04B 1/0003* (2013.01); *H04B 7/22* (2013.01);
(Continued)

(58) Field of Classification Search
None
See application file for complete search history.

(56) References Cited

U.S. PATENT DOCUMENTS

| | | | |
|---|---|---|---|
| 3,852,742 | A | 12/1974 | Fletcher |
| 3,922,617 | A | 11/1975 | Denniston |

(Continued)

FOREIGN PATENT DOCUMENTS

| | | | |
|---|---|---|---|
| EP | 0755141 | A2 | 1/1997 |
| EP | 1959625 | B1 | 2/2009 |

(Continued)

OTHER PUBLICATIONS

Cai et al., "Efficient encoding of IEEE 802.11n in LDPC codes", Electronics Letters, Feb. 2006. (Year: 2006).*

(Continued)

*Primary Examiner* — Faruk Hamza
*Assistant Examiner* — Cassandra L Decker
(74) *Attorney, Agent, or Firm* — ALSTON & BIRD LLP

(57) ABSTRACT

A backscatter tag device includes, in part, a receiver configured to receive a packet conforming to a communication protocol defining a multitude of codewords, a codeword translator configured to translate at least a first subset of the multitude of codewords disposed in the packet to a second multitude of codewords defined by the protocol in response to a data the backscatter tag is invoked to transmit, and a transmitter configured to transmit the packet supplied by the codeword translator at a frequency different than the first frequency at which the packer is received. The communication protocol may optionally be the 802.11g/n, ZigBee or the Bluetooth communication protocol.

18 Claims, 10 Drawing Sheets

Related U.S. Application Data

(60) Provisional application No. 62/412,712, filed on Oct. 25, 2016.

(51) Int. Cl.

| | | |
|---|---|---|
| *H04B 5/77* | (2024.01) | |
| *H04B 7/22* | (2006.01) | |
| *H04W 4/80* | (2018.01) | |
| *H04W 52/02* | (2009.01) | |
| *H04W 84/12* | (2009.01) | |

(52) U.S. Cl.

CPC ........... *H04W 52/0203* (2013.01); *H04B 5/77* (2024.01); *H04W 4/80* (2018.02); *H04W 84/12* (2013.01)

(56) References Cited

U.S. PATENT DOCUMENTS

| | | | |
|---|---|---|---|
| 4,053,885 A | 10/1977 | Tomita | |
| 4,173,017 A | 10/1979 | Burlage | |
| 4,287,579 A | 9/1981 | Inoue et al. | |
| 4,324,258 A | 4/1982 | Huebscher et al. | |
| 4,885,590 A | 12/1989 | Hasan | |
| 4,952,193 A | 8/1990 | Talwar | |
| 5,061,934 A | 10/1991 | Brown et al. | |
| 5,188,112 A | 2/1993 | Sturgill et al. | |
| 5,212,827 A | 5/1993 | Meszko et al. | |
| 5,444,864 A | 8/1995 | Smith | |
| 5,691,978 A | 11/1997 | Kenworthy | |
| 5,734,967 A | 3/1998 | Kotzin et al. | |
| 5,790,658 A | 8/1998 | Yip et al. | |
| 5,818,383 A | 10/1998 | Stockburger et al. | |
| 5,883,597 A | 3/1999 | DeWulf | |
| 5,930,301 A | 7/1999 | Chester et al. | |
| 6,069,583 A | 5/2000 | Silvestrin et al. | |
| 6,198,427 B1 | 3/2001 | Aker et al. | |
| 6,215,812 B1 | 4/2001 | Young et al. | |
| 6,400,306 B1 | 6/2002 | Nohara et al. | |
| 6,411,250 B1 | 6/2002 | Oswald et al. | |
| 6,498,581 B1 | 12/2002 | Yu | |
| 6,539,204 B1 | 3/2003 | Marsh et al. | |
| 6,567,649 B2 | 5/2003 | Souissi | |
| 6,639,551 B2 | 10/2003 | Li et al. | |
| 6,725,017 B2 | 4/2004 | Blount et al. | |
| 6,745,018 B1 | 6/2004 | Zehavi et al. | |
| 6,965,657 B1 | 11/2005 | Rezvani et al. | |
| 7,215,976 B2 | 5/2007 | Brideglall | |
| 7,336,940 B2 | 2/2008 | Smithson | |
| 7,349,505 B2 | 3/2008 | Blount et al. | |
| 7,362,257 B2 | 4/2008 | Bruzzone et al. | |
| 7,426,242 B2 | 9/2008 | Thesling | |
| 7,460,615 B2 | 12/2008 | Kunysz et al. | |
| 7,564,396 B2 | 7/2009 | Van Veldhoven et al. | |
| 7,869,527 B2 | 1/2011 | Vetter et al. | |
| 8,005,235 B2 | 8/2011 | Gupta et al. | |
| 8,060,803 B2 | 11/2011 | Kim | |
| 8,086,191 B2 | 12/2011 | Fukuda et al. | |
| 8,155,595 B2 | 4/2012 | Sahin et al. | |
| 8,175,535 B2 | 5/2012 | Mu | |
| 8,179,990 B2 | 5/2012 | Orlik et al. | |
| 8,218,697 B2 | 7/2012 | Guess et al. | |
| 8,242,888 B2 | 8/2012 | Tuttle | |
| 8,331,477 B2 | 12/2012 | Huang et al. | |
| 8,351,533 B2 | 1/2013 | Shrivastava et al. | |
| 8,385,871 B2 | 2/2013 | Wyville | |
| 8,422,540 B1 | 4/2013 | Negus et al. | |
| 8,633,805 B2 | 1/2014 | Tuttle | |
| 8,755,756 B1 | 6/2014 | Zhang et al. | |
| 8,830,123 B2 | 9/2014 | Rao | |
| 8,995,410 B2 | 3/2015 | Balan et al. | |
| 9,042,838 B2 | 5/2015 | Braithwaite | |
| 9,054,795 B2 | 6/2015 | Choi et al. | |
| 9,065,519 B2 | 6/2015 | Cyzs et al. | |
| 9,077,421 B1 | 7/2015 | Mehlman et al. | |
| 9,124,475 B2 | 9/2015 | Li et al. | |
| 9,184,902 B2 | 11/2015 | Khojastepour et al. | |
| 9,246,554 B2 | 1/2016 | Maguire | |
| 9,325,432 B2 | 4/2016 | Hong et al. | |
| 9,351,333 B1* | 5/2016 | Zhang | H04L 5/00 |
| 9,357,341 B2 | 5/2016 | Deyle | |
| 9,367,711 B1 | 6/2016 | Dacus et al. | |
| 9,441,966 B2 | 9/2016 | Ruizenaar | |
| 9,887,728 B2 | 2/2018 | Jain et al. | |
| 9,927,519 B1 | 3/2018 | Omer et al. | |
| 10,142,822 B1 | 11/2018 | Zalewski et al. | |
| 10,230,419 B2 | 3/2019 | Bharadia et al. | |
| 10,243,718 B2 | 3/2019 | Hong et al. | |
| 10,243,719 B2 | 3/2019 | Bharadia et al. | |
| 10,284,356 B2 | 5/2019 | Bharadia et al. | |
| 10,338,205 B2 | 7/2019 | Zhang et al. | |
| 2002/0064245 A1 | 5/2002 | McCorkle | |
| 2003/0031279 A1 | 2/2003 | Blount et al. | |
| 2003/0053659 A1 | 3/2003 | Pavlidis et al. | |
| 2003/0099287 A1 | 5/2003 | Arambepola | |
| 2003/0148748 A1 | 8/2003 | Shah | |
| 2004/0106381 A1 | 6/2004 | Tiller | |
| 2004/0155754 A1* | 8/2004 | Fischer | H04B 5/0075 340/10.34 |
| 2005/0078743 A1 | 4/2005 | Shohara | |
| 2005/0083179 A1* | 4/2005 | Carrender | G06K 19/0723 340/10.4 |
| 2005/0129152 A1 | 6/2005 | Hillstrom | |
| 2005/0159128 A1 | 7/2005 | Collins et al. | |
| 2005/0190870 A1 | 9/2005 | Blount et al. | |
| 2005/0253688 A1 | 11/2005 | Fukuda | |
| 2005/0254555 A1 | 11/2005 | Teague | |
| 2005/0282500 A1 | 12/2005 | Wang et al. | |
| 2006/0029124 A1 | 2/2006 | Grant et al. | |
| 2006/0030277 A1 | 2/2006 | Cyr et al. | |
| 2006/0044114 A1 | 3/2006 | Friedrich et al. | |
| 2006/0044147 A1 | 3/2006 | Knox et al. | |
| 2006/0058022 A1 | 3/2006 | Webster et al. | |
| 2006/0083297 A1 | 4/2006 | Yan et al. | |
| 2006/0209754 A1 | 9/2006 | Ji et al. | |
| 2007/0003141 A1 | 1/2007 | Rittscher et al. | |
| 2007/0018722 A1 | 1/2007 | Jaenecke | |
| 2007/0105509 A1 | 5/2007 | Muhammad et al. | |
| 2007/0143655 A1* | 6/2007 | Niu | H04L 27/2602 714/752 |
| 2007/0171119 A1 | 7/2007 | Dwelly et al. | |
| 2007/0207747 A1 | 9/2007 | Johnson et al. | |
| 2007/0223617 A1 | 9/2007 | Lee et al. | |
| 2007/0247314 A1* | 10/2007 | Barink | G06K 7/0008 340/572.2 |
| 2007/0249314 A1 | 10/2007 | Sanders et al. | |
| 2007/0274372 A1 | 11/2007 | Asai et al. | |
| 2008/0004796 A1 | 1/2008 | Schott et al. | |
| 2008/0037801 A1 | 2/2008 | Alves et al. | |
| 2008/0089397 A1 | 4/2008 | Vetter et al. | |
| 2008/0107046 A1 | 5/2008 | Kangasmaa et al. | |
| 2008/0129581 A1 | 6/2008 | Douglass et al. | |
| 2008/0129584 A1 | 6/2008 | Antonik et al. | |
| 2008/0131133 A1 | 6/2008 | Blunt et al. | |
| 2008/0192636 A1 | 8/2008 | Briscoe et al. | |
| 2008/0219339 A1 | 9/2008 | Chrabieh et al. | |
| 2008/0219377 A1 | 9/2008 | Nisbet | |
| 2008/0255911 A1 | 10/2008 | Khosia | |
| 2008/0278293 A1 | 11/2008 | Drucker | |
| 2009/0022089 A1 | 1/2009 | Rudrapatna | |
| 2009/0034437 A1 | 2/2009 | Shin et al. | |
| 2009/0047914 A1 | 2/2009 | Axness et al. | |
| 2009/0115912 A1 | 5/2009 | Liou et al. | |
| 2009/0147837 A1 | 6/2009 | Lau | |
| 2009/0180404 A1 | 7/2009 | Jung et al. | |
| 2009/0186582 A1 | 7/2009 | Muhammad et al. | |
| 2009/0195357 A1* | 8/2009 | Tsai | G06K 19/0701 455/91 |
| 2009/0221231 A1 | 9/2009 | Weng et al. | |
| 2009/0262005 A1 | 10/2009 | McNeill et al. | |
| 2009/0303004 A1 | 12/2009 | Tuttle | |
| 2009/0303908 A1 | 12/2009 | Deb et al. | |
| 2009/0305650 A1 | 12/2009 | Wenger et al. | |
| 2010/0014600 A1 | 1/2010 | Li et al. | |

(56) References Cited

U.S. PATENT DOCUMENTS

| | | |
|---|---|---|
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Yeh et al. |
| 2010/0117693 A1 | 5/2010 | Lorg et al. |
| 2010/0136900 A1 | 6/2010 | Seki |
| 2010/0150033 A1 | 6/2010 | Zinser et al. |
| 2010/0152600 A1 | 6/2010 | Droitcour et al. |
| 2010/0156610 A1 | 6/2010 | Wild et al. |
| 2010/0159837 A1 | 6/2010 | Dent et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0240999 A1 | 9/2010 | Droitcour et al. |
| 2010/0249630 A1 | 9/2010 | Droitcour et al. |
| 2010/0249633 A1 | 9/2010 | Droitcour et al. |
| 2010/0279602 A1 | 11/2010 | Larsson et al. |
| 2010/0292568 A1 | 11/2010 | Droitcour et al. |
| 2010/0295716 A1 | 11/2010 | Yamaki et al. |
| 2011/0007846 A1* | 1/2011 | Marien .............. G06K 19/0723 |
| | | 375/319 |
| 2011/0013684 A1 | 1/2011 | Semenov et al. |
| 2011/0026509 A1 | 2/2011 | Tanaka |
| 2011/0080264 A1 | 4/2011 | Clare et al. |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0243202 A1 | 10/2011 | Lakkis |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0032843 A1 | 2/2012 | Lee et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0161931 A1 | 6/2012 | Karmakar et al. |
| 2012/0201173 A1 | 8/2012 | Jain et al. |
| 2012/0268253 A1 | 10/2012 | Tuttle |
| 2012/0309454 A1 | 12/2012 | Maguire |
| 2012/0319819 A1 | 12/2012 | Tkachenko |
| 2012/0321006 A1 | 12/2012 | Akita et al. |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |
| 2013/0113647 A1 | 5/2013 | Sentelle et al. |
| 2013/0114468 A1 | 5/2013 | Hui et al. |
| 2013/0155913 A1 | 6/2013 | Sarca |
| 2013/0166259 A1 | 6/2013 | Weber et al. |
| 2013/0194419 A1 | 8/2013 | Bhowmick et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0301487 A1 | 11/2013 | Khandani |
| 2013/0301488 A1 | 11/2013 | Hong et al. |
| 2014/0126437 A1 | 5/2014 | Patil et al. |
| 2014/0169236 A1 | 6/2014 | Choi et al. |
| 2014/0206300 A1 | 7/2014 | Hahn et al. |
| 2014/0219139 A1 | 8/2014 | Choi et al. |
| 2014/0301379 A1 | 10/2014 | Shoarinejad |
| 2015/0091706 A1 | 4/2015 | Chemishkian et al. |
| 2015/0156003 A1 | 6/2015 | Khandani |
| 2015/0156004 A1 | 6/2015 | Khandani |
| 2016/0092706 A1 | 3/2016 | Deyle |
| 2016/0266245 A1 | 9/2016 | Bharadia et al. |
| 2016/0365890 A1 | 12/2016 | Reynolds et al. |
| 2017/0090026 A1 | 3/2017 | Joshi et al. |
| 2017/0180178 A1* | 6/2017 | Gollakota ................ H04K 3/25 |
| 2017/0264420 A1 | 9/2017 | Bharadia et al. |
| 2018/0375703 A1 | 12/2018 | Kellogg et al. |
| 2019/0074973 A1 | 3/2019 | Hadaschik et al. |
| 2019/0274144 A1 | 9/2019 | Zhang et al. |
| 2020/0212956 A1* | 7/2020 | Gollakota .............. H04B 1/713 |

FOREIGN PATENT DOCUMENTS

| | | | |
|---|---|---|---|
| EP | 2237434 A1 | 10/2010 | |
| EP | 2267946 A2 | 12/2010 | |
| JP | 2001-196994 A | 7/2001 | |
| JP | 2004-56315 A | 2/2004 | |
| RU | 2256985 C2 | 7/2005 | |
| WO | WO 2009/106515 A1 | 9/2009 | |
| WO | WO 10/132850 A1 | 11/2010 | |
| WO | WO 2012/106262 A1 | 8/2012 | |
| WO | WO 2012/106263 A1 | 8/2012 | |
| WO | WO 2013/185106 A1 | 12/2013 | |
| WO | WO 2014/093916 A1 | 6/2014 | |
| WO | WO 2014/121290 A1 | 8/2014 | |
| WO | WO 2015/021481 A2 | 2/2015 | |
| WO | WO 2015/048678 A1 | 4/2015 | |
| WO | WO 2015/073905 A2 | 5/2015 | |
| WO | WO 2015/168700 A1 | 11/2015 | |
| WO | WO 2017/132400 A1 | 8/2017 | |

OTHER PUBLICATIONS

Abari, et al., "Caraoke: An E-Toll Transponder Network for Smart Cities," Proceedings of the 2015 ACM Conference on Special Interest Group on Data Communication, SIGCOMM '15, pp. 297-310, ACM, (2015). [Retrieved from the Internet Nov. 27, 2017: <http://www.mit.edu/~abari/Papers/Sigcomm15.pdf>].

Adib et al., "See Through Walls with Wi-Fi!," Proceedings of the ACM SIGCOMM 2013 conference on SIGCOMM, SIGCOMM '13, pp. 75-86, ACM, New York, NY, USA, (2013).

Adib, et al., "3D Tracking via Body Radio Reflections," Proceedings of the 11th USENIX Symposium on Networked Systems Design and Implementation, pp. 317-329, (2014).

Archer, et al., "Interface Contracts for TinyOS," IPSN '07: Proceedings of the 6th international conference on Information processing in sensor networks, pp. 158-165 (2007).

Argenox, "A BLE Advertising Primer," 14 pages. [Retrieved from the Internet Nov. 13, 2017: <http://www.argenox.com/bluetooth-low-energy-ble-v4-0-development/library/a-ble-advertising-primer/>].

Aryafar, et al., "MIDU: Enabling MIMO Full Duplex," Proceedings of the 18th annual international conference on Mobile computing and networking, Mobicom '12, pp. 257-268, (2012).

Bahl, et al., "Reconsidering Wireless Systems With Multiple Radios," ACM SIG-COMM CCR, (2004).

Bahl, et al., "White Space Networking with Wi-Fi like Connectivity," SIGCOMM Comput. Commun. Rev., 39(4):27-38, (2009).

Bardwell, "Tech Report." [Retrieved from the Internet Dec. 3, 2016: <http://www.connect802.com/download/ techpubs/2005/commercial_ radios_E052315.pdf>].

Bharadia et al., "Full Duplex Radios" SIGOMM, Aug. 12-16, 2013, Hong Kong, China, Copyright 2013 ACM 978-1-4503-2056-6/6/ 13/08, 12 pages.

Bharadia et al., "Full Duplex Radios," In Proceedings of the ACM SIGCOMM 2013 conference on SIGCOMM, SIGCOMM '13, pp. 375-386, ACM, New York, NY, USA, (2013).

Bharadia, "Full Duplex Backscatter," Proceedings of the 12th ACM Workshop on Hot Topics in Networks, 7 pages, ACM, (2013).

Bharadia, et al., "BackFi: High Throughput WiFi Backscatter," Proceedings of the 2015 ACM Conference on Special Interest Group on Data Communication, pp. 283-296, ACM, (2015). [Retrieved from the Internet Nov. 27, 2017: <https://web.stanford.edu/~skatti/ pubs/sigcomm15-backfi.pdf>].

(56)                    References Cited

OTHER PUBLICATIONS

Bharadia, et al., "FastForward: Fast and Constructive Full Duplex Relays," Proceedings of the 2014 ACM Conference on SIG-COMM, pp. 199-210, ACM, (2014). [Retrieved via the Internet Nov. 28, 2017: <https://web.stanford.edu/~skatti/pubs/sigcomm14-ff.pdf>].

Bharadia, et al., "Full Duplex Mimo Radios," Proceedings of the 11th USENIX Symposium on Networked Systems Design and Implementation (NSDI 14), pp. 359-372, USENIX Association, (2014). [Retrieved from the Internet Nov. 27, 2017: <https://www.usenix.org/system/files/conference/nsdi14/nsdi14-paper-bharadia.pdf>].

Bicket, "Bit-rate Selection in Wireless Networks," Master's thesis, MIT, 2005.

Bindu et al., "Active microwave imaging for breast cancer detection," Progress in Electromagnetics Research, vol. 58: 149-169, (2006).

Blefari-Melazzi, et al., "TCP Fairness Issues in IEEE 802.11 Networks: Problem Analysis and Solutions Based on Rate Control," IEEE Transactions on Wireless Communications, 6(4): 1346-1355 (2007).

Bliss, et al., "Simultaneous Transmission and Reception for Improved Wireless Network Performance," Proceedings of the 2007 IEEE Workshop on Statistical Signal Processing, (2007).

Bortz, et al., "The Simplex Gradient and Noisy Optimization Problems," North Carolina State University, Department of Mathematics, Center for Research in Scientific Computation, (1998).

Boyd, "Sequential Convex Programming." [Retrieved from the Internet Oct. 26, 2016: http://www.stanford.edu/class/ ee364b/lectures/seq_slides.pdf].

Boyd, Sequential Convex Programming, [Retrieved from the Internet May 8, 2017: <http://stanford.edu/class/ee364b/lectures/seq_slides.pdf>].

Briggs, et al., "Power Measurements of OFDM Signals," IEEE Symposium on Electromagnetic Compatibility, (2004).

Buettner, et al., "An Empirical Study of UHF RFID Performance," Proceedings of the 14th ACM International Conference on Mobile Computing and Networking, ACM, 223-234, (2008). [Retrieved from the Internet Nov. 27, 2017: <http://citeseerx.ist.psu.edu/viewdoc/download?doi=10.1.1.163.4811&rep=rep1&type=pdf>].

Burlingame, et al., "An Analog CMOS High-Speed Continuous-Time FIR Filter," Solid-State Circuits Research Laboratory, Department of Electrical and Computer Engineering, University of California, Davis, CA, (2000).

Cavoukian, "Whole Body Imaging in Airport Scanners: Building in Privacy by Design," Information and Privacy Commissioner of Ontario, Mar. 2009. [Retrieved from the Internet Oct. 25, 2016: https://www.ipc.on.ca/wp-content/uploads/.../wholebodyimaging.pdf].

Chandra, "A Case for Adapting Channel Width in Wireless Networks," ACM SIGCOMM, (2008).

Choi, et al., "Achieving Single Channel, Full Duplex Wireless Communication," Proceedings of the 16th Annual International Conference on Mobile Computing and Networking, pp. 1-12, ACM, (2010). [Retrieved via the Internet Nov. 27, 2017: <https://sing.stanford.edu/pubs/mobicom10-duplex.pdf>].

Choi, et al., "Granting Silence to Avoid Wireless Collisions," Proceedings of the 18th International Conference on Network Protocols (ICNP), (2010).

Choi, et al., "IEEE 802.11e Contention-Based Channel Access (EDCF) Performance Evaluation," IEEE ICC (2003).

Choi, et al., "The Case for a Network Protocol Isolation Layer," Sensys '09: Proceedings of the 7th ACM Conference on Embedded networked sensor systems (SenSys), pp. 267-280, (2009).

Chu, et al., "The Design and Implementation of a Declarative Sensor Network System," Proceedings of the 5th international conference on Embedded networked sensor systems, (2007).

Coffman, et al., "Channel Fragmentation in Dynamic Spectrum Access Systems—a Theoretical Study," ACM SIGMETRICS, (2010).

Culler, et al., "Towards a Sensor Network Architecture: Lowering the Waistline," Proceedings of the Tenth Workshop on Hot Topics in Operating Systems (HotOS-X), (2005).

Ding, "Digital Predistortion of Power Amplifiers for Wireless Applications," Ph.D Thesis, School of Electrical and Computer Engineering, Georgia Institute of Technology, (Mar. 2004).

Duarte et al., "Experiment-driven Characterization of Full-Duplex Wireless Systems," (2011). [Retrieved from the Internet Oct. 25, 2016: https://arxiv.org/abs/1107.1276].

Duarte, "Experiment-driven Characterization of Full-Duplex Wireless Systems," CoRR, abs/1107.1276, (2011).

Duarte, et al., "Full-Duplex Wireless Communications Using Off-The-Shelf Radios: Feasibility and First Results," Forty-Fourth Asilomar Conference on Signals, Systems, and Components, (2010).

Ekanadham, "Continuous Basis Pursuit and Its Applications," PhD thesis, New York, NY, USA, AAI3546394, (2012).

Elhamifar et al., "Sparse Subspace Clustering: Algorithm, Theory, and Applications, IEEE Transactions on Pattern Analysis and Machine Intelligence," 35(11):2765-2781, (2013).

Ensworth, et al., "Every Smart Phone is a Backscatter Reader: Modulated Backscatter Compatibility with Bluetooth 4.0 Low Energy (BLE) Devices," 2015 IEEE International Conference on RFID, pp. 78-85, IEEE, (2015).

Erceg et al., "TGn channel models," Tech. Rep. IEEE P802.11, Wireless LANs, Garden Grove, Calif, USA, (2004).

Ettus Research, "VERT2450 Antenna," 1 page. https://www.ettus.com/product/details/VERT2450. [Retrieved via the Internet Nov. 27, 2017: https://www.ettus.com/product/details/VERT2450].

Ettus Research, UHD Daughterboard Application Notes. [Retrieved from the Internet Dec. 8, 2016: <http://files.ettus.com/uhd_docs/manual/html/dboards.html>].

Ettus Research, Universal Software Radio Peripheral (USRP). [Retrieved from the Internet Dec. 3, 2016: < http://www.ettus.com>].

Everett, et al., "Empowering Full-Duplex Wireless Communication by Exploiting Directional Diversity," 2011 Conference Record of the Forty Fifth Asilomar Conference on Signals, Systems and Computers, pp. 2002-2006, (Nov. 2011).

Everett, et al., "Passive Self-Interference Suppression for Full-Duplex Infrastructure Nodes," CoRR, abs/1302.2185, (2013).

FCC, Table of Frequency Allocations. [Retrieved from the Internet Dec. 3, 2016: <http://transition.fcc.gov/oet/spectrum/table/fcctable.pdf>].

FDA, "Medical Imaging," [Retrieved from the Internet Oct. 25, 2016: http://www.fda.gov/Radiation-EmittingProducts/RadiationEmittingProductsandProcedures/MedicalImaging/MedicalX-Rays/ucm115317.htm].

Fear et al., "Confocal Microwave Imaging for Breast Cancer Detection: Localization of Tumors in Three Dimensions," IEEE Transactions on Biomedical Engineering, 49(8):812-822, (2002).

Fear et al., "Microwave Detection of Breast Cancer," IEEE Transactions on Microwave Theory and Techniques, 48(11):1854-1863, (2000).

Fear, et al., "Enhancing breast tumor detection with near-field imaging," Microwave Magazine, IEEE, 3(1):48-56, (2002).

Fleury et al., "Channel Parameter Estimation in Mobile Radio Environments Using the SAGE Algorithm," IEEE Journal on Selected Areas in Communications, 17(3):434-450, (1999).

Gember, et al., "A Comparative Study of Handheld and Non-Handheld Traffic in Campus Wi-Fi Networks," Passive and Active Measurement Conf., (2011).

Gheorma, et al., "Rf Photonic Techniques for Same Frequency Simultaneous Duplex Antenna Operation," IEEE Photonics Technology Letters, 19(13): 1014-1016, (2007).

Gill, Slide Presentation: "RF performance of mobile terminals—a challenge for the industry," Cambridge Wireless Radio Technology Special Interest Group (SIG), (2011).

Gizmodo, "IPhone 4 Antenna-Gate," (2011). [Retrieved from the Internet Dec. 3, 2016: <http://gizmodo.com/5846638/giz-explains-whats-so-smart-about-the-iphone-4ss-antenna>].

Gnawali, et al., "Collection Tree Protocol," Proceedings of the 7th ACM Conference on Embedded Networked Sensor Systems (SenSys), pp. 1-14 (2009).

(56)　　　　References Cited

OTHER PUBLICATIONS

Goldsmith, "Wireless Communications," Cambridge University Press, (2004).

Gollakota, et al., "The Emergence of RF-Powered Computing," Computer, 47(1):32-39, (2014). [Retrieved via the Internet Nov. 27, 2017: <http://citeseerx.ist.psu.edu/viewdoc/download?doi=10.1.1.472.5564&rep=rep1&type=pdf>].

Gollakota, et al., "They Can Hear Your Heartbeats: Non-Invasive Security for Implantable Medical Devices," SIGCOMM Comput. Commun. Rev., 41(4), (Aug. 2011).

Gollakota, et al., "ZigZag Decoding: Combating Hidden Terminals in Wireless Networks," SIGCOMM '08: Proceedings of the ACM SIGCOMM 2008 Conference on Data Communication, pp. 159-170, (2008).

Gummadi, et al., "Understanding and Mitigating the Impact of RF Interference on 802.11 Networks," Proceedings of the 2007 conference on Applications, technologies, architectures, and protocols for computer communications (SIGCOMM), (2007).

Gummeson, et al., "Flit: A Bulk Transmission Protocol for RFID-Scale Sensors," Proceedings of the 10th International Conference on Mobile Systems, Applications, and Services, pp. 71-84, ACM, (2012). [Retrieved via the Internet Nov. 27, 2017: <https://web.stanford.edu/~pyzhang/papers/sys010fp-gummeson.pdf>].

Guo et al., "Microwave Imaging via Adaptive Beamforming Methods for Breast Cancer Detection," Progress in Electromagnetics Research, vol. 1, 350-353, (2005).

Halperin, et al., "Taking the Sting out of Carrier Sense: Interference Cancellation for Wireless LANs." MobiCom '08: Proceedings of the 14th ACM international conference on Mobile computing and networking, pp. 339-350, (2008).

Halperin, et al., "Tool Release: Gathering 802.11n Traces with Channel State Information," ACM SIGCOMM Computer Communication Review, 41(1):53, 2011. [Retrieved via the Internet Nov. 27, 2017: <http://www.sigcomm.org/sites/default/files/ccr/papers/2011/January/1925861-1925870.pdf>].

Harashima, "Matched-Transmission Technique for Channels With Intersymbol Interference," IEEE Transactions on Communications, COM-20:774-780, (1972).

Hassanieh, et al., "Securing RFIDs by Randomizing the Modulation and Channel," Proceedings of the 12th USENIX Symposium on Networked Systems Design and Implementation (NSDI '15), (2015). [Retrieved via the Internet Nov. 27, 2017: <https://www.usenix.org/system/files/conference/nsdi15/nsdi15-paper-hassanieh.pdf>].

Hong et al., "Picasso: Flexible RF and Spectrum Slicing," In Proceedings of the ACM SIGCOMM 2012 conference on Applications, technologies, architectures, and protocols for computer communication, SIGCOMM '12, pp. 283-284, ACM, Helsinki, Finland, (2012).

Hong, et al, "DOF: A Local Wireless Information Plane," ACM SIGCOMM, (2011).

Hu, et al., "Braidio: An Integrated Active-Passive Radio for Mobile Devices with Asymmetric Energy Budgets," Proceedings of the 2016 Conference on ACM SIGCOMM 2016 Conference, pp. 384-397, ACM, (2016). [Retrieved via the Internet Nov. 27, 2017: <https://people.cs.umass.edu/~dganesan/papers/Sigcomm16-Braidio.pdf>].

Hu, et al., "Laissez-Faire: Fully Asymmetric Backscatter Communication," Proceedings of the 2015 ACM Conference on Special Interest Group on Data Communication, pp. 255-267, ACM, (2015). [Retrieved via the Internet Nov. 27, 2017: <https://conferences.sigcomm.org/sigcomm/2015/pdf/papers/p255.pdf>].

Hu, et al., "Leveraging Interleaved Signal Edges for Concurrent Backscatter," Proceedings of the 1st ACM Workship on Hot Topics in Wireless, pp. 13-18, ACM, (2014). [Retrieved via the Internet Nov. 27, 2017: <https://panhu.me/pdf/BST.pdf>].

Hua, et al., "A method for Broadband Full-Duplex Mimo Radio," IEEE Signal Processing Letters, 19(12):793-796, (Dec. 2012).

Huang, "Optimal Transmission Strategies for Dynamic Spectrum Access in Cognitive Radio Networks," IEEE Transactions on Mobile Computing, 8(12): 1636-1648, (2009).

Huyer, et al., "SNOBFIT—Stable Noisy Optimization by Branch and Fit," ACM Trans. Math. Softw., 35:9:1-9:25, (Jul. 2008).

Intersil Corp, "Qhx220 Active Isolation Enhancer and Interference Canceller." [Retrieved from the Internet Dec. 6, 2016: <http://www.intersil.com/content/dam/Intersil/documents/qhx2/qhx220.pdf>].

Italian National Research Council, "Dielectric Properties of Body Tissues." [Retrieved from the Internet Oct. 25, 2016: http://niremf.ifac.cnr.it/tissprop/].

Iyer, et al., "Inter-Technology Backscatter: Towards Internet Connectivity for Implanted Devices," Proceedings of the 2016 Conference on ACM SIGCOMM 2016 Conference, pp. 356-369, ACM (2016). [Retrieved via the Internet Nov. 27, 2017: <https://homes.cs.washington.edu/~gshyam/Papers/interscatter.pdf>].

Iyer, et al., "Specnet: Spectrum Sensing Sans Frontiers," USENIX NSDI, (2011).

Jain et al., "Practical, Real-time, Full Duplex Wireless," MobiCom '11, pp. 301-312, ACM, New York, NY, USA, (2011).

Jain, et al., "Practical, Real-Time, Full Duplex Wireless," Proceedings of the 17th Annual International Conference on Mobile Computing and Networking, pp. 301-312, ACM, (2011). [Retrieved via the Internet Nov. 27, 2017: <https://web.stanford.edu/~skatti/pubs/mobicom11-duplex.pdf>].

Jain, et al., "Throughput Fairness Index: An Explanation," Technical Report, Department of CIS, The Ohio State University, 9 pages, (1999). [Retrieved via the Internet Nov. 27, 2017: <http://www.cse.wustl.edu/~jain/atmf/ftp/atm99-0045.pdf>].

Jamieson, et al., "PPR: Partial Packet Recovery for Wireless Networks," Proceedings of the 2007 conference on Applications, technologies, architectures, and protocols for computer communications (SIGCOMM), (2007).

Jiang, et al., "An Architecture for Energy Management in Wireless Sensor Networks," Proceedings of the International Workshop on Wireless Sensornet Architecture (WWSNA), (2007).

Joshi, et al, "Pinpoint: Localizing interfering radios," Proceedings of the 10th USENIX Conference on Networked Systems Design and Implementation, NSDI '13, pp. 241-254, (2013).

Jung, et al., "A Reconfigurable Carrier Leakage Canceler for UHF RFID Reader Front-Ends," IEEE Transactions on Circuits and Systems I: Regular Papers, 58(1):70-76, (Jan. 2011).

Katti, et al., "Embracing Wireless Interference: Analog Network Coding," ACM SIGCOMM Computer Communication Review, 37(4):397-408, ACM, (2007). [Retrieved via the Internet Nov. 27, 2017: <https://homes.cs.washington.edu/~gshyam/Papers/anc.pdf>].

Katti, et al., "XORS in the Air: Practical Wireless Network Coding," IEEE/ACM Transactions on Networking (ToN), 16(3):497-510, (2008). [Retrieved via the Internet Nov. 27, 2017: <http://citeseerx.ist.psu.edu/viewdoc/download?doi=10.1.1.212.6393&rep=rep1&type=pdf>].

Kellogg, et al., "Bringing Gesture Recognition to All Devices," Proceedings of the 11th USENIX Symposium on Networked Systems Design and Implementation (NSDI '14), pp. 303-316, (2014). [Retrieved via the Internet Nov. 27, 2017: <https://www.usenix.org/system/files/conference/nsdi14/nsdi14-paper-kellogg.pdf>].

Kellogg, et al., "Passive Wi-Fi: Bringing Low Power to Wi-Fi Transmissions," Proceedings of the 13th USENIX Symposium on Networked Systems Design and Implementation (NSDI '16), pp. 151-164, (2016). [Retrieved via the Internet Nov. 27, 2017: <https://www.usenix.org/system/files/conference/nsdi16/nsdi16-paper-kellogg.pdf>].

Kellogg, et al., "Wi-Fi Backscatter: Internet Connectivity for RF-Powered Devices," Proceedings of the 2014 ACM Conference on SIGCOMM, pp. 607-618, ACM, (2014). [Retrieved via the Internet Nov. 27, 2017: <https://homes.cs.washington.edu/~gshyam/Papers/wifibackscatter.pdf>].

Khojastepour, et al., "The Case for Antenna Cancellation for Scalable Full Duplex Wireless Communications," ACM HOTNETS, (2011).

Kim, et al., "Co-Channel Interference Cancellation Using Single Radio Frequency and Baseband Chain," IEEE Transactions on Communications, 58(7):2169-2175, (2010).

(56) References Cited

OTHER PUBLICATIONS

Kim, et al., "Flush: A Reliable Bulk Transport Protocol for Multihop Wireless Networks," In Proceedings of the Fifth ACM Conference on Embedded networked sensor systems (SenSys), (2007).

Klues, et al., "Integrating Concurrency Control and Energy Management in Device Drivers," Proceedings of twenty-first ACM SIGOPS symposium on Operating systems principles (SOSP), (2007).

Knox, "Single Antenna Full Duplex Communications using a Common Carrier," 2012 IEEE 13th Annual Wireless and Microwave Technology Conference (WAMICON), pp. 1-6, (2012).

Kuhn, "The Hungarian Method for the Assignment Problem," Naval Research Logistics Quarterly 2, 2:83-97, (1955). [Retrieved from the Internet May 8, 2017: <https://tom.host.cs.st-andrews.ac.uk/CS3052-CC/Practicals/Kuhn.pdf>].

Lakshminarayanan, et al., "Rfdump; An Architecture for Monitoring the Wireless Ether," ACM CoNEXT, (2009).

Lamprecht, et al., "Passive Alignment of Optical Elements in a Printed Circuit Board," Electric Components and Technology Conference, (2006).

Lee, et al., "Improving Wireless Simulation Through Noise Modeling," Proceedings of the 6th international conference on Information processing in sensor networks (IPSN), pp. 21-30, (2007).

Leith, et al., "TCP Fairness in 802.11e WLANs," IEEE Communications Letters, 9(12), (2005).

Levis, et al., "T2: A Second Generation OS for Embedded Sensor Networks," Technical Report TKN-05-007, Telecommunication Networks Group, Technische Universitat Berlin, (2005).

Liang, et al., "Sensing-Throughput Tradeoff for Cognitive Radio Networks," IEEE Transactions on Wireless Communications, 7(4):1326-1337, (2008).

Liang, et al., "Surviving Wi-Fi Interference in Low Power Zigbee Networks," Proceedings of the Eighth ACM Conference on Embedded Networked Sensor Systems (SenSys), (2010).

Lin, et al., "Data Discovery and Dissemination with DIP," Proceedings of the 7th international conference on Information processing in sensor networks (IPSN), pp. 433-444, (2008).

Liu, et al., "Ambient Backscatter: Wireless Communications Out of Thin Air," ACM SIGCOMM Computer Communication Review, 43:39-50, (2013). [Retrieved via the Internet Nov. 27, 2017: <http://abc.cs.washington.edu/files/comm153-liu.pdf>].

Liu, et al., "Enabling Instantaneous Feedback with Full-duplex Backscatter," Proceedings of the 20th Annual International Conference on Mobile Computing and Networking, pp. 67-78, ACM, (2014). [Retrieved via the Internet Nov. 27, 2017: <https://homes.cs.washington.edu/~gshyam/Papers/fullduplexbackscatter.pdf>].

Mango Communications, 802.11 Reference Design: PHY, 4 pages. [Retrieved via the Internet Nov. 27, 2017: <https://warpproject.org/trac/wiki/802.11/PHY>].

Matheus, "Optimal Design of a Multicarrier Systems with Soft Impulse Shaping Including Equalization in Time or Frequency Direction," Global Telecommunications Conference, 1997, GLOBECOM '97, IEEE, vol. 1, pp. 310-314, (Nov. 1997).

Mattingly, et al., "CVXGEN: a code generator for embedded convex optimization," Optimization and Engineering, 13(1):1-27, (2012). [Retrieved from the Internet May 9, 2017: <http://stanford.edu/~boyd/papers/pdf/code_gen_impl.pdf>].

Maxim Integrated, Power Amplifier Data-sheet. [Retrieved from the Internet Dec. 6, 2016: <http://datasheets.maximintegrated.com/en/ds/MAX2828-MAX2829.pdf>].

Mini-Circuits, Power Amplifier Data-sheet. [Retrieved from the Internet Dec. 6, 2016: <http://www.minicircuits.com/pdfs/PGA-105+.pdf>].

Mini-Circuits, Power Amplifier Data-sheet. [Retrieved from the Internet Dec. 6, 2016: <http://www.minicircuits.com/pdfs/ZHL-30W-262+.pdf>].

Morgan, et al, "A Generalized Memory Polynomial Model for Digital Predistortion of RF Power Amplifiers," IEEE Transactions on Signal Processing, 54(10):3852-3860, (2006).

National Instruments, N1 5781 Datasheet, (2011). [Retrieved from the Internet Dec. 6, 2016: <http://sine.ni.com/ds/app/doc/p/id/ds-212/lang/en>].

National Instruments, NI PXIe-8133 User Manual, (Jul. 2012). [Retrieved from the Internet Dec. 13, 2016: <www.ni.com/pdf/manuals/372870d.pdf>].

National Instruments, White Paper: "Understanding Dynamic Hardware Specifications," (Mar. 2010).

Ou, et al., "Come and Be Served: Parallel Decoding for COTS RFID Tags," Proceedings of the 21st Annual International Conference on Mobile Computing and Networking, ACM, pp. 500-511, (2015). [Retrieved via the Internet Nov. 27, 2017: <https://www.sigmobile.org/mobicom/2015/papers/p500-ouA.pdf>].

Palazzi, et al., "A RIO-Like Technique for Interactivity Loss-Avoidance in Fast-Paced Multiplayer Online Games," ACM Computers in Entertainment, (2005).

Parks, et al., "Turbocharging Ambient Backscatter Communication," Proceedings of the 2014 ACM Conference on SIGCOMM, pp. 619-630, ACM, (2014). [Retrieved via the Internet Nov. 27, 2017: <https://homes.cs.washington.edu/~gshyam/Papers/turbocharge.pdf>].

Patel, et al., "A review of wearable sensors and systems with application in rehabilitation," Journal of Neuroengineering and Rehabilitation, 9(1):21 (17 pages), (2012). [Retrieved via the Internet Nov. 27, 2017: <https://jneuroengrehab.biomedcentral.com/track/pdf/10.1186/1743-0003-9-21?site=jneuroengrehab.biomedcentral.com>].

Peregrine Semiconductor, PE 47303 Data-sheet. [Retrieved from the Internet Dec. 6, 2016: <http://www.psemi.com/pdf/datasheets/pe43703ds.pdf>].

Pletcher, "Ultra-Low Power Wake-Up Receivers for Wireless Sensor Networks," Ph.D. Dissertation, University of California Berkeley, 164 pages, (2008). [Retrieved via the Internet Nov. 27, 2017: <https://www2.eecs.berkeley.edu/Pubs/TechRpts/2008/EECS-2008-59.pdf>].

Polastre, et al., "A Unifying Link Abstraction for Wireless Sensor Networks," SenSys '05: Proceedings of the 3rd international conference on Embedded networked sensor systems, pp. 76-89, (2005).

Poston, et al., "Discontiguous OFDM Considerations for Dynamic Spectrum Access in Idle TV Channels," IEEE DySPAN, (2005).

Pu, et al., "Whole-Home Gesture Recognition Using Wireless Signals," Proceedings of the 19th Annual International Conference on Mobile Computing & Networking, MobiCom '13, pp. 27-38, (2013). https://wisee.cs.washington.edu/wisee_paper.pdf].

Radunović, et al., "Efficiency and Fairness in Distributed Wireless Networks Through Self-Interference Cancellation and Scheduling," Technical Report MSR-TR-2009-27, Microsoft Research, (2009).

Radunović, et al., "Rethinking Indoor Wireless Mesh Design: Low Power, Low Frequency, Full-duplex," Fifth IEEE Workshop on Wireless Mesh Networks (WiMesh), pp. 1-6, (2010).

Rahul, et al., "Learning to Share: Narrowband-Friendly Wideband Networks," ACM SIGCOMM, (2008).

Ralston, et al., Real-time Through-wall Imaging Using an Ultrawideband Multiple-Input Multiple-Output (MIMO) Phased Array Radar System, 2010 IEEE Symposium on Phased Array Systems and Technology (ARRAY), pp. 551-558, (2010).

Remcom, "Modeling Indoor Propagation." [Retrieved from the Internet May 8, 2017: http://www.remcom.com/examples/modeling-indoor-propagation.html].

Rice University, WARP Project. [Retrieved from the Internet Dec. 8, 2016: <http://warp.rice.edu>].

Rohde & Schwarz, "Rohde & Schwarz FSW Signal and Spectrum Analyzer User Manual," (2016). [Retrieved from the Internet Dec. 10, 2016: <https://cdn.rohde-schwarz.com/pws/dl_downloads/dl_common_library/dl_manuals/gb_1/f/fsw_1/FSW_UserManual_en_26.pdf>].

Rohde & Schwarz, "Rohde & Schwarz Smbv 100A Signal Generator User Manual," (2016). [Retrieved from the Internet Dec. 6, 2016: <https://cdn.rohde-schwarz.com/pws/dl_downloads/dl_common_library/dl_manuals/gb_1/s/smbv/SMBV100A_Operating Manual_en_16.pdf>].

(56)                    References Cited

OTHER PUBLICATIONS

Sahai et al., "On the Impact of Phase Noise on Active Cancellation in Wireless Full-Duplex," (2012). [Retrieved from the Internet Oct. 25, 2016: https://arxiv.org/pdf/1212.5462].

Sahai, et al., "On the Impact of Phase Noise on Active Cancellation in Wireless Full-Duplex," CoRR, abs/1212.5462, (2012).

Sahai, et al., "Spectrum Sensing: Fundamental limits," Jan. 26, 2021: chapter for a Springer Book: Cognitive Radios: System Design Perspective, (Jun. 2009).

Sen, et al., "AccuRate: Constellation Based Rate Estimation in Wireless Networks," Proceedings of the Seventh USENIX Symposium on Networked Systems Design and Implementation (NSDI), (2010).

Sen, et al., "CSMA/CN: Carrier Sense Multiple Access with Collision Notification," Proceedings of the 16th annual international conference on Mobile computing and networking (MobiCom), pp. 25-36, (2010).

Shen, et al., "Channel Estimation in OFDM Systems," Application Note, Freescale Semiconductor, (2006).

Srinivasan, et al., "An Empirical Study of Low-Power Wireless," ACM Transactions on Sensor Networks, 6(2):1-49, (2010).

Srinivasan, et al., "RSSI is Under Appreciated," Proceedings of the Third Workshop on Embedded Networked Sensors (EmNets), (2006).

Srinivasan, et al., "Some Implications of Low Power Wireless to IP Networking," Proceedings of the Fifth Workshop on Hot Topics in Networks (HotNets-V), (Nov. 2006).

Srinivasan, et al., "The κ-Factor: Inferring Protocol Performance Using Inter-Link Reception Correlation," Proceedings of the 16th annual international conference on Mobile computing and networking (MobiCom), (2010).

Srinivasan, et al., The β-factor: Measuring Wireless Link Burstiness, Proceedings of the Sixth ACM Conference on Embedded Networked Sensor Systems, (Nov. 2008).

Sundstrom et al., "Power Dissipation Bounds for High-Speed Nyquist Analog-to-Digital Converters," IEEE Transactions on Circuits and Systems I: Regular Papers, 56(3):509-518, (2009).

Surowiec et al., "Dielectric Properties of Breast Carcinoma and the Surrounding Tissues," IEEE Transactions on Biomedical Engineering, 35(4):257-263, (1988).

Talla, et al., "Hybrid Analog-Digital Backscatter: A New Approach for Battery-Free Sensing," 2013 IEEE International Conference on RFID, pp. 74-81, (2013).

Talla, et al., "Powering the Next Billion Devices with Wi-Fi," arXiv preprint arXiv:1505.06815, (2015). [Retrieved via the Internet Nov. 27, 2017: <https://arxiv.org/pdf/1505.06815.pdf>].

Tan, et al., "Fine Grained Channel Access in Wireless LAN," ACM SIGCOMM, (2010).

Tan, et al., "Spectrum Virtualization Layer," MSR Tech Report, (2011). [Retrieved from the Internet Dec. 8, 2016: <http://research.microsoft.com/apps/pubs/default.aspx?id=154410>].

Tavakoli, et al., "A Declarative Sensornet Architecture," Proceedings of the International Workshop on Wireless Sensornet Architecture (WWSNA), (2007).

TI, TI CC2541 radio, 3 pages. [Retrieved via the Internet Nov. 27, 2017: <http://www.ti.com/product/CC2541>].

TI, TI CC2650 radio, 3 pages. [Retrieved via the Internet Nov. 27, 2017: <http://www.ti.com/product/CC2650>].

Tibshirani, "Regression shrinkage and selection via the lasso," Journal of the Royal Statistical Society, Series B (Methodological), pp. 267-288 (1996).

Tomlinson, "New Automatic Equaliser Employing Modulo Arithmetic," Electronic Letters, 7(5/6):138-139, (1971).

Tourrilhes, "Fragment Adaptive Reduction: Coping with Various interferers in radio unlicensed bands," IEEE IC, (2001).

Tse et al., "Fundamentals of Wireless Communications," Aug. 13, 2004. [Retrieved from the Internet Oct. 25, 2016: www.eecs.berkeley.edu/~dtse/main.pdf].

Van De Beek, et al., "On Channel Estimation in OFDM Systems," IEEE 45th Vehicular Technology Conference, vol. 2, pp. 815-819, (1995).

Vutukuru, et al., "Cross-Layer Wireless Bit Rate Adaption," SIGCOMM Comput. Commun. Rev., 39(4):3-14, (2009).

Wang, et al., "Dude, Where's My Card ?: RFID Positioning That Works with Multipath and Non-Line of Sight," ACM SIGCOMM Computer Communication Review, 43:51-62, ACM, (2013). [Retrieved via the Internet Nov. 27, 2017: <http://citeseerx.ist.psu.edu/viewdoc/download?doi=10.1.1.594.4575&rep=rep1&type=pdf>].

Wang, et al., "Efficient and Reliable Low-Power Backscatter Networks," Proceedings of the ACM SIGCOMM 2012 Conference on Applications, Technologies, Architectures, and Protocols for Computer Communication, pp. 61-72, ACM, (2012). [Retrieved via the Internet Nov. 27, 2017: <http://haitham.ece.illinois.edu/Papers/sigcomm12-backscatter.pdf>].

Wang, et al., "Rf-Compass: Robot Object Manipulation Using RFIDs," Proceedings of the 19th Annual International Conference on Mobile Computing & Networking (MobiCom '13), pp. 3-14, ACM, (2013). [Retrieved via the Internet Nov. 27, 2017: <https://dspace.mit.edu/openaccess-disseminate/1721.1/87045>].

Wang, et al., "RF-IDraw: Virtual Touch Screen in the Air Using RF Signals," Proceedings of the 2014 ACM conference on SIGCOMM, pp. 235-246, (2014). [Retrieved via the Internet Nov. 27, 2017: <http://www.sigcomm.org/sites/default/files/ccr/papers/2014/August/2619239-2626330.pdf>].

Weingarten, et al., "The Capacity Region of the Gaussian Multiple-Input Multiple-Output Broadcast Channel," IEEE Transactions on Information Theory, 52(9):3936-3964, (2006).

Welch, et al., "An Introduction to the Kalman Filter," Technical report, Chapel Hill, NC, USA, (2006). [Retrieved from the Internet May 9, 2017: <https://www.cs.unc.edu/~welch/media/pdf/kalman_intro.pdf>].

Wi-Fi Alliance, WiFi Direct Industry White Paper, (2010). [Retrieved from the Internet Dec. 13, 2016: <http://www.wi-fi.org/discover-wi-fi/wi-fi-direct>].

Wikipedia, "Star Trek Tricoder," [Retrieved from the Internet Oct. 26, 2016: http://en.wikipedia.org/wiki/Tricorder].

Winter, et al., "RPL: IPV6 Routing Protocol for Low power and Lossy Networks," IETF Internet Jan. 26, 2021: (Work in Progress), (Jul. 2010). [Retrieved from the Internet Dec. 8, 2016: <https://tools.ietf.org/id/1/26/2021:-ietf-roll-rpl-11.txt>].

Wischik, et al., "Design, implementation and evaluation of congestion control for multipath TCP," USENIX NSDI, (2011).

Xilinx, DS249: LogiCore IP CORDIC v4.0 Data Sheet, (Mar. 1, 2011). [Retrieved from the Internet Dec. 3, 2016: <http://www.xilinx.com/support/documentation/ip_documentation/cordic_ds249.pdf>].

Xilinx, UG193: XtremeDSP User Guide, (Jan. 26, 2012). [Retrieved from the Internet Dec. 6, 2016: <https://www.xilinx.com/support/documentation/user_guides/ug193.pdf>].

Xiong et al., "ArrayTrack: A Fine-Grained Indoor Location System" In Proceedings of the 10th USENIX conference on Networked Systems Design and Implementation, nsdi'13, pp. 71-84, USENIX Association, Berkeley, CA, USA, (2013).

Yang, et al., "Supporting Demanding Wireless Applications with Frequency-agile Radios," USENIX NSDI, (2010).

Yang, et al., "Tagoram: Real-Time Tracking of Mobile RFID Tags to High Precision Using COTS Devices," Proceedings of the 20th Annual International Conference on Mobile Computing and Networking, ACM, 237-248, (2014). [Retrieved via the Internet Nov. 27, 2017: <http://citeseerx.ist.psu.edu/viewdoc/download?doi=10.1.1.431.5456&rep=rep1&type=pdf>].

Yang, et al., "The Spaces Between Us: Sensing and Maintaining Boundaries in Wireless Spectrum Access," ACM MOBICOM, (2010).

Yoo, et al., "On the Optimality of Multiantenna Broadcast Scheduling Using Zero-Forcing Beamforming," IEEE Journal on Selected Areas in Communications, 24(3):528-541, (2006).

Yuan, et al., "KNOWS: Kognitiv Networking Over White Spaces," IEEE DySPAN, (2007).

Zhang et al., "A novel method for microwave breast cancer detection," Progress in Electromagnetics Research, vol. 83: 413-434, (2008).

(56) References Cited

OTHER PUBLICATIONS

Zhang, "FreeRider hardware and software source code," 2 pages, 2017. [Retrieved via the Internet Nov. 27, 2017: <https://github.com/pengyuzhang/FreeRider>].

Zhang, et al., "Enabling Backscatter Communication among commodity Wi-Fi Radios," Proceedings of the 2016 ACM SIGCOMM Conference pp. 611-612; Aug. 22, 2016.

Zhang, et al., "BLINK: A High Throughput Link Layer for Backscatter Communication," Proceedings of the 10th International Conference on Mobile Systems, Applications, and Services, pp. 99-112, ACM, (2012). [Retrieved via the Internet Nov. 27, 2017: <http://lass.cs.umass.edu/~gummeson/MobiSys12-BLINK.pdf>].

Zhang, et al., "EkhoNet: High Speed Ultra Low-power Backscatter for Next Generation Sensors," Proceedings of the 20th Annual International Conference on Mobile Computing and Networking, pp. 557-568, ACM, (2014). [Retrieved from the Internet Nov. 28, 2017: <https://people.cs.umass.edu/~dganesan/papers/Mobicom14-EkhoNet.pdf>].

Zhang, et al., "Enabling Bit-by-Bit Backscatter Communication in Severe Energy Harvesting Environments," Proceedings of the 11th USENIX Symposium on Networked Systems Design and Implementation (NSDI '14), Berkeley, CA, (2014). [Retrieved via the Internet Nov. 27, 2017: <https://www.usenix.org/system/files/conference/nsdi14/nsdi14-paper-zhang.pdf>].

Zhang, et al., "Enabling Practical Backscatter Communication for On-body Sensors," Proceedings of the 2016 conference on ACM SIGCOMM 2016 Conference, pp. 370-383, ACM, (2016). [Retrieved via the Internet Nov. 27, 2017: [Retrieved via the Internet Nov. 27, 2017: <https://pdfs.semanticscholar.org/be77/7196c9fdf60c667d3e020b77b28223b5cd3b.pdf>].

Zhang, et al., "Gain/Phase Imbalance-Minimization Techniques for LINC Transmitters," IEEE Transactions on Microwave Theory and Techniques, 49(12):2507-2516, (2001).

Zhang, et al., "HitchHike: Practical Backscatter Using Commodity WiFi," SenSys '16, ACM, 13 pages, (2016). [Retrieved via the Internet Nov. 27, 2017: <https://web.stanford.edu/~pyzhang/papers/sensys16_back_comm.pdf>].

Zhang, et al., "QuarkOS: Pushing the operating limits of micropowered sensors," Proceedings of the 14th USENIX conference on Hot Topics in Operating Systems, p. 7, USENIX Association, (2013). [Retrieved via the Internet Nov. 27, 2017: <https://www.usenix.org/system/files/conference/hotos13/hotos13-final19.pdf>].

CA Application No. 3,041,667, Examination Report mailed May 5, 2020.

Chinese Application No. 201380041721.0, First Office Action issued Nov. 18, 2015.

EP Application No. 17863512.4 (now published as EP3532981), Supplementary European Search Report and European Search Opinion mailed May 27, 2020.

EPO Application No. 20130801200, Supplementary European Search Report mailed Feb. 4, 2016.

PCT International Preliminary Report on Patentability for application PCT/US2015/029105 mailed Nov. 8, 2016.

PCT International Preliminary Report on Patentablility for application PCT/US2012/023183 issued Aug. 6, 2013.

PCT International Preliminary Report on Patentablility for application PCT/US2012/023184 issued Aug. 6, 2013.

PCT International Preliminary Report on Patentablility for application PCT/US2013/044830 issued Dec. 9, 2014.

PCT International Preliminary Report on Patentablility for application PCT/US2013/075166 issued Jun. 16, 2015.

PCT International Preliminary Report on Patentablility for application PCT/US2014/014726 issued Aug. 4, 2015.

PCT International Preliminary Report on Patentablility for application PCT/US2014/050584 issued Feb. 9, 2016.

PCT International Preliminary Report on Patentablility for application PCT/US2014/058117 issued Mar. 29, 2016.

PCT International Preliminary Report on Patentablility for application PCT/US2014/065814 issued May 17, 2016.

PCT International Search Report and Written Opinion of the International Searching Authority for application PCT/US2012/023183 mailed May 17, 2012.

PCT International Search Report and Written Opinion of the International Searching Authority for application PCT/US2012/023184 mailed May 7, 2012.

PCT International Search Report and Written Opinion of the International Searching Authority for application PCT/US2013/075166 issued Apr. 22, 2014.

PCT International Search Report and Written Opinion of the International Searching Authority for application PCT/US2014/014726 mailed Jun. 2, 2014.

PCT International Search Report and Written Opinion of the International Searching Authority for application PCT/US2014/050584 mailed Jan. 21, 2015.

PCT International Search Report and Written Opinion of the International Searching Authority for application PCT/US2014/058117 mailed Dec. 30, 2014.

PCT International Search Report and Written Opinion of the International Searching Authority for application PCT/US2014/065814 mailed Feb. 19, 2015.

PCT International Search Report and Written Opinion of the International Searching Authority for application PCT/US2015/029105 mailed Jul. 27, 2015.

PCT International Search Report and Written Opinion of the International Searching Authority for application PCT/US2017/058371 mailed Jan. 12, 2018.

PCT International Search Report for application PCT/US2013/044830 mailed Sep. 26, 2013.

PCT Written Opinion of the International Searching Authority for application PCT/US2013/044830 mailed Sep. 26, 2013.

U.S. Appl. No. 13/293,069, Advisory Action mailed Aug. 29, 2017.

U.S. Appl. No. 13/293,069, Final Office Action mailed May 2, 2017.

U.S. Appl. No. 13/293,069, Final Office Action mailed Jun. 8, 2016.

U.S. Appl. No. 13/293,069, Final Office Action mailed Oct. 21, 2014.

U.S. Appl. No. 13/293,069, Non-Final Office Action mailed Jan. 6, 2017.

U.S. Appl. No. 13/293,069, Non-Final Office Action mailed May 1, 2014.

U.S. Appl. No. 13/293,069, Non-Final Office Action mailed Jul. 17, 2013.

U.S. Appl. No. 13/293,069, Non-Final Office Action mailed Sep. 21, 2015.

U.S. Appl. No. 13/293,069, Notice of Allowance mailed Sep. 27, 2017.

U.S. Appl. No. 13/293,069, Notice of Allowance mailed Oct. 6, 2017.

U.S. Appl. No. 13/293,072, Applicant Initiated Interview Summary mailed Aug. 7, 2018.

U.S. Appl. No. 13/293,072, Final Office Action mailed Mar. 15, 2016.

U.S. Appl. No. 13/293,072, Final Office Action mailed Apr. 5, 2018.

U.S. Appl. No. 13/293,072, Final Office Action mailed Aug. 3, 2017.

U.S. Appl. No. 13/293,072, Final Office Action mailed on Mar. 31, 2014.

U.S. Appl. No. 13/293,072, Non-Final Office Action mailed Jan. 13, 2017.

U.S. Appl. No. 13/293,072, Non-Final Office Action mailed Jul. 17, 2015.

U.S. Appl. No. 13/293,072, Non-Final Office Action mailed Jul. 19, 2013.

U.S. Appl. No. 13/293,072, Notice of Allowance mailed Oct. 17, 2018.

U.S. Appl. No. 13/293,072, Notice of Allowance mailed Dec. 27, 2018.

U.S. Appl. No. 13/762,043, Final Office Action mailed Jun. 8, 2015.

U.S. Appl. No. 13/762,043, Non-Final Office Action mailed Nov. 17, 2014.

U.S. Appl. No. 13/762,043, Notice of Allowance mailed Nov. 9, 2015.

(56)　　　　　References Cited

OTHER PUBLICATIONS

U.S. Appl. No. 13/913,323, Final Office Action mailed Apr. 21, 2015.

U.S. Appl. No. 13/913,323, Non-Final Office Action mailed Mar. 12, 2015.

U.S. Appl. No. 13/913,323, Notice of Allowance mailed Feb. 12, 2016.

U.S. Appl. No. 13/913,323, Notice of Allowance mailed Oct. 16, 2015.

U.S. Appl. No. 13/913,323, Notice of Allowance mailed Nov. 5, 2015.

U.S. Appl. No. 13/913,323, Notice of Allowance mailed Nov. 13, 2015.

U.S. Appl. No. 14/456,807, Non-Final Office Action mailed Mar. 4, 2016.

U.S. Appl. No. 14/456,807, Non-Final Office Action mailed Sep. 21, 2018.

U.S. Appl. No. 14/456,807, Non-Final Office Action mailed Oct. 25, 2017.

U.S. Appl. No. 14/456,807, Notice of Allowance mailed Mar. 1, 2019.

U.S. Appl. No. 14/456,807, Notice of Allowance mailed Jun. 6, 2018.

U.S. Appl. No. 15/025,256, Non-Final Office Action mailed Oct. 19, 2017.

U.S. Appl. No. 15/025,256, Notice of Allowance mailed Jan. 3, 2019.

U.S. Appl. No. 15/025,256, Notice of Allowance mailed May 21, 2018.

U.S. Appl. No. 15/025,256, Notice of Allowance mailed Sep. 13, 2018.

U.S. Appl. No. 15/033,889, Final Office Action mailed Nov. 26, 2018.

U.S. Appl. No. 15/033,889, Non-Final Office Action mailed Apr. 27, 2018.

U.S. Appl. No. 15/033,889, Notice of Allowance mailed Jan. 27, 2021.

U.S. Appl. No. 15/033,889, Notice of Allowance mailed Jun. 29, 2021.

U.S. Appl. No. 15/033,889, Notice of Allowance mailed Nov. 13, 2019.

U.S. Appl. No. 15/133,175, Final Office Action mailed May 10, 2018.

U.S. Appl. No. 15/133,175, Non-Final Office Action mailed Sep. 21, 2017.

U.S. Appl. No. 15/133,175, Notice of Allowance mailed Nov. 28, 2018.

U.S. Appl. No. 15/307,221, Notice of Allowance mailed Mar. 11, 2021.

U.S. Appl. No. 15/307,221, Notice of Allowance mailed Aug. 13, 2021.

U.S. Appl. No. 15/307,721, Final Office Action mailed Dec. 11, 2019.

U.S. Appl. No. 15/307,721, Non-Final Office Action mailed Apr. 29, 2019.

U.S. Appl. No. 15/307,721, Non-Final Office Action mailed Jul. 8, 2020.

U.S. Appl. No. 15/676,474, Non-Final Office Action mailed May 25, 2018.

U.S. Appl. No. 15/676,474, Notice of Allowance mailed Jan. 17, 2019.

U.S. Appl. No. 16/344,983, Correctred Notice of Allowance mailed Sep. 29, 2022.

U.S. Appl. No. 16/344,983, Final Office Action mailed Jan. 11, 2021.

U.S. Appl. No. 16/344,983, Non-Final Office Action mailed Aug. 21, 2020.

U.S. Appl. No. 16/344,983, Notice of Allowance mailed Jun. 8, 2022.

WIPO Application No. PCT/US2017/058371, PCT International Preliminary Report on Patentability issued Apr. 30, 2019.

* cited by examiner

BACKSCATTERING AMBIENT ISM BAND SIGNALS

CROSS-REFERENCE TO RELATED APPLICATIONS

The present application is a continuation of U.S. application Ser. No. 16/344,983, titled "BACKSCATTERING AMBIENT ISM BAND SIGNALS," filed Apr. 25, 2019, which is a U.S. National Stage of PCT/US2017/058371, filed Oct. 25, 2017, which claims the benefit under 35 U.S.C. § 119 (e) of U.S. Provisional Application No. 62/412,712, filed Oct. 25, 2016, entitled "FREERIDER: BACKSCATTERING AMBIENT ISM BAND SIGNALS," filed Oct. 25, 2016, the contents of all which are incorporated herein by reference in their entirety for all purposes.

The present invention is related to application Ser. No. 15/676,474, filed Aug. 14, 2017, the content of which is incorporated herein by reference in its entirety.

FIELD OF THE INVENTION

The present invention relates to communication systems and methods, and more particularly to a low power WiFi backscattering communication system and method.

BACKGROUND OF THE INVENTION

Backscatter communication has attracted interest for applications such as implantable sensors, wearables, and smart home sensing because of its ability to offer low power connectivity to these sensors. Such applications have severe power constraints. Implantable sensors for example have to last for years, while even more traditional smart home monitoring applications may benefit from sensors and actuators that can last several years. Backscatter communication can satisfy the connectivity requirements while consuming such low power as to be energized by harvesting energy, or with batteries that could last several years.

Current backscatter systems require specialized hardware to generate the excitation RF signals that backscatter radios can reflect, as well as to decode the backscattered signals. Recent research such as Wi-Fi backscatter to BackFi and passive WiFi have reduced the need for specialized hardware. Passive WiFi for example can decode using standard WiFi radios, however it still requires a dedicated continuous wave signal generator as the excitation RF signal source. BackFi needs a proprietary full duplex hardware add-on to WiFi radios to enable backscatter communication. Consequently, a need continues to exist for a backscatter system that can be deployed using commodity devices such as access points, smartphones, watches and tablets.

BRIEF DESCRIPTION OF THE INVENTION

DETAILED DESCRIPTION OF THE INVENTION

Embodiments of the present invention provide a system and method of communication that is complaint with an existing communications protocol, such as WiFi 802.11g/n, Bluetooth, and ZigBee, by backscattering another compliant packet and modulating its data on the resulting packet by codeword translation. According to some embodiments, applications can be built on existing wireless devices carrying such packets. A low-power backscatter communications system (hereinafter alternatively referred to as backscatter tag, or tag) is configured, in part, to receive a valid codeword disposed in the transmitted, for example, 802.11g/n packet and translate it to a different valid codeword from, for example, the 802.11g/n codebook. The specific translation encodes the bit that the backscatter tag seeks to transmit. The backscattered packet is therefore like any other, for example, 802.11g/n packet, albeit with a sequence of translated codewords depending on the data that backscatter tag seeks to communicate. Consequently it can be decoded by any standard 802.11g/n, WiFi, Bluetooth, and ZigBee receiver. The following description of the embodiments of the present invention is provided with reference to WiFi 802.11g/n, Bluetooth, and ZigBee communications protocol or standards. It is understood however that embodiments of the present invention are equally applicable to many other communication protocols.

A backscatter communication system, in accordance with embodiments of the present invention, may use commodity radios by using codeword translation. As is known, any wireless signal on the ISM band is generated using a set of known codewords from a fixed codebook. For example, Bluetooth uses FSK modulation and has two codewords in its codebook: it transmits a tone at one frequency to send a one, and a different frequency to send a zero. Similarly, WiFi and ZigBee also have finite sets of codewords that vary in combinations of phase, amplitude or frequency.

To perform codeword translation, a tag transforms (or translates) the ongoing excitation signal's codeword into another valid codeword in the same codebook during backscattering. This is achieved by modifying one or more of the amplitude, phase, or frequency of the excitation signal. The specific translation depends on the data that the tag seeks to communicate and the type of the excitation signal. Because the codeword in the backscattered signal is a valid codeword from the same codebook as the original excitation signal, a commodity radio may be used to receive the backscattered signal.

Figure 1:
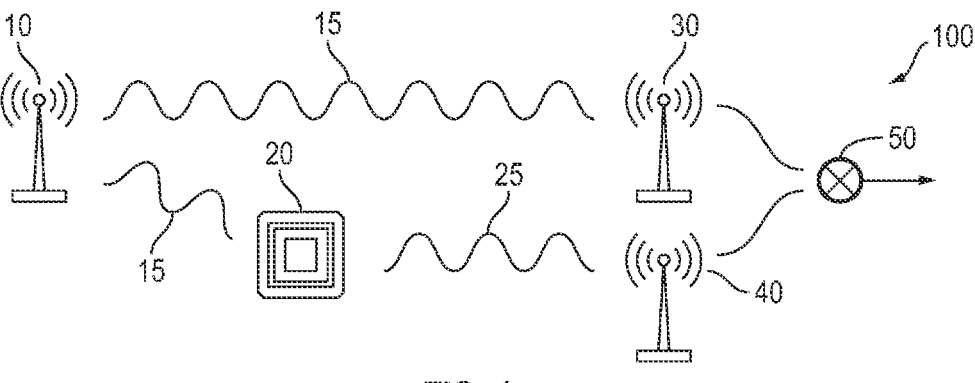
FIG. 1 is a simplified view of a backscatter communication system 100, in accordance with one embodiment of the present invention.

FIG. 1 is a simplified view of a backscatter communication system 100, in accordance with one embodiment of the present invention. An ISM band radio, which may be a WiFi, Bluetooth or ZigBee transmitter, transmits data in the form of packets 15 during normal operation to receiver 30, which may be a commodity receiver, such as WiFi, Bluetooth or ZigBee. An internet-of-things (IoT) device 20 (which is also referred to herein as a tag) also receives packets 15, implements codeword translation to embed the information that tag 20 seeks to transmit as described further below, and backscatters the codeword translated packet 25 to receiver 40, which may also be a commodity receiver, such as WiFi, Bluetooth or ZigBee. The backscattered signal (alternatively referred to herein as packet) 25 is frequency shifted to another channel. Accordingly, receiver 30 receives and decodes the originally transmitted packets 15 and receiver 40 receives and decodes the backscattered packets 25. Decoder 50 is configured to compare the packets received by receivers 30 and 40 thereby to retrieve the tag data embedded by tag 20.

Embodiments of the present invention support multiple tags on the same wireless channel by leveraging packet length modulation to transmit necessary information to the tags for coordination. To achieve this, the length of the excitation packet 15 is used to encode 0s and 1s, which can be arranged to form messages to the tags that implement a backscatter MAC protocol. The protocol thus sends control messages to the tags so that the tags can coordinate their transmissions to avoid collisions.

Embodiments of the present invention achieve, among other things, the following objectives. One embodiment decodes backscattered OFDM WiFi signals from 42 m in a line-of-sight (LOS) deployment, and 22 m in a non-line-of-sight (NLOS) deployment. One embodiment achieves a throughput of nearly 60 kbps from a backscattered OFDM WiFi signal when a LOS receiver is 18 m or closer. For farther distances, in one example, an average of 32 kbps (LOS) and 20 kbps (NLOS) is achieved. One embodiment backscatters ZigBee signals from up to, for example, 22 m, achieving 15 kbps. One embodiment backscatters Bluetooth signals up to, for example, 12 m, achieving 55 kbps. A backscatter tag, in accordance with embodiments of the present invention may coexists with WiFi networks independent of the type of excitation signal the tag is backscattering. Furthermore, in one experimental setup, up to 20 backscatter tags were shown to operate effectively while communicating successfully in a MAC scheme and maintaining uplink fairness.

When a tag, in accordance with embodiments of the present invention, backscatters an excitation signal, the tag may modify one or more of the signal's amplitude, phase, or frequency. Such modification is shown below where S(t) represents the excitation signal, T(t) represents the tag signal, and B(t) represents the backscattered signal. The backscattered signal B(t) is the time domain product between the excitation signal S(t) and the tag signal T(t). Therefore, a tag may change its signal T(t) to modify the amplitude, phase, and frequency of the backscattered signal B(t). Signals S(t), T(t), and B(t) may be represented as shown below:

$$S(t) = A_s e^{j(2\pi f_s t + \theta_s)} \qquad (1)$$

-continued $$T(t) = A_t e^{j(2\pi f_t t + \theta_t)}$$

$$B(t) = S(t)T(t)$$

$$= A_s e^{j(2\pi f_s t + \theta_s)} A_t e^{j(2\pi f_t t + \theta_t)}$$

$$= A_s A_t e^{j(2\pi (f_s + f_t)t + (\theta_s + \theta_t))}$$

A tag, in accordance with embodiments of the present invention, is configured to modify the amplitude of the backscattered signal by tuning the terminating impedance of the tag antenna. The backscattered signal B(t) strength is defined by:

$$\Gamma = \frac{Z_T - Z_A^*}{Z_A + Z_T}$$

In the above expression, $Z_A$ represents the tag antenna impedance and $Z_T$ represents the impedance across tag antenna terminals. A more exact relationship between the backscattered signal strength and $\Gamma$ may be seen in "Hybrid analog-digital backscatter: A new approach for battery-free sensing in RFID (RFID)", authored by Vamsi Talla and Joshua R Smith, IEEE International Conference on IEEE, 2013, pp. 74-81.

In a conventional backscatter system, a tag switches between $Z_{T_1} = Z_A$ and $Z_{T_2} = 0$ to encode information. Therefore, two levels of amplitude are seen on a backscattered signal. Instead of switching between two impedances, as is done conventionally for creating the analog backscatter signal, a tag, in accordance with embodiments of the present invention varies across a multitude of impedances to fine tune the amplitude of the backscattered signal.

A tag, in accordance with one embodiment of the present invention, changes the phase of the backscattered signal by delaying the tag signal. In order to introduce an additional phase offset $\Delta\theta$ at the tag, the tag signal is delayed by $$\frac{\Delta\theta}{2\pi f_t}.$$

The phase offset $\Delta\theta$ introduced at the tag leads to a phase offset on the backscattered signal. To change the frequency of the backscattered signal, the tag changes the toggling frequency of its RF transistor. Therefore, a tag, in accordance with embodiments of the present invention, is configured to modify the amplitude, phase, and frequency of the backscattered signal, thereby to enable backscatter communication between commodity radios.

Codeword Translation

To communicate with a commodity radio, a backscatter tag, in accordance with one embodiment of the present invention, performs codeword translation, as described further A codeword $C_i$ is defined herein as a signal symbol on the physical layer that represents specific data transmitted. For example, Bluetooth uses binary FSK modulation to embed information. Therefore, it only uses two codewords, $C_1 = e^{j2\pi f_1 t}$ and $C_2 = e^{j2\pi f_2 t}$ to represent data one and data zero respectively.

A codebook B is the set of valid codewords used by a radio. The codebook associated with Bluetooth is B={$C_1$, $C_2$} because only two codewords are used in the Bluetooth standard. Similarly, WiFi 802.11g/n standard uses a codebook B={$C_1$, $C_2$ .... $C_n$}, where $C_i$, wherein i is an index ranging from 1 to n, and is an OFDM symbol. As is well known, the WiFi, ZigBee and Bluetooth use different sets of codewords and codebooks.

Different codewords in the same codebook are related to each other by a shift in phase, amplitude, frequency or a combination thereof. For example, the codeword $C_1$ used by the Bluetooth standard only differs from $C_2$ in the Bluetooth standard in the frequency domain, with a frequency difference of $f_2$-$f_1$.

Codeword translation is the act of transformation of a valid codeword $C_i$ to another valid codeword $C_j$ where both codewords belong to the same codebook, meaning $C_i \in B$ and $C_j \in B$. A backscatter tag, in accordance with embodiments of the present invention, performs such translation in compliance with WiFi, ZigBee, and Bluetooth standards, while consuming a relatively small amount of power. Because the transformed/translated codeword remains a valid codeword in the same codebook, a commodity WiFi, ZigBee, or Bluetooth radio may be used to decode the backscatter signal. The tag data is encoded by the specific codeword translations, as described further below.

An example of codeword translation performed by a tag, in accordance with embodiments of the present invention is shown in expression (2) below, where the codeword of the excitation signal is $C_i$. To encode a one, the tag translates the codeword $C_i$ to $C_j$ before transmission. To encode a zero, the tag leaves the codeword untranslated, therefore, the backscatter signal has the same codeword as the excitation signal.

$$\text{backscatter codeword} = \begin{cases} C_j & \text{Tag data one} \\ C_i & \text{Tag data zero} \end{cases} \quad (2)$$

By using codeword translation, the tag decodes the backscatter signal using commodity WiFi, ZigBee, or Bluetooth radios to extract the tag data. Table I below shows the logic table for decoding a backscatter signal.

TABLE I

| decoded codeword | excitation signal codeword | tag bit |
|---|---|---|
| $C_2$ | $C_1$ | 1 |
| $C_1$ | $C_2$ | 1 |
| $C_1$ | $C_1$ | 0 |
| $C_2$ | $C_2$ | 0 |

As is seen from Table I, the tag bits are the XOR function of the backscattered codeword and the original codeword. Therefore, the tag data may be extracted by computing the XOR of the original excitation bitstream and the backscatter bitstream.

As was described above, a tag performs codeword translation by modifying the amplitude, phase, or frequency of the excitation signal. Such modification transforms the excitation codeword from $C_i$ to $C_j$ in the backscattered signal. A tag performing codeword translation is frequency agnostic, and thus applies the same modification on signals across all frequencies. This does not pose any problems for standards that use a single carrier wave, such as Bluetooth, ZigBee, and 802.11b standards. However, because an OFDM signal associated with the 802.11n standard uses multiple subcarriers, the above codeword translation can cause problems. When a tag changes the amplitude of a signal on subcarrier i, it will introduce the same amplitude modification on another subcarrier m. However, the modified signal on subcarrier m may not be a valid codeword.

Figure 2:
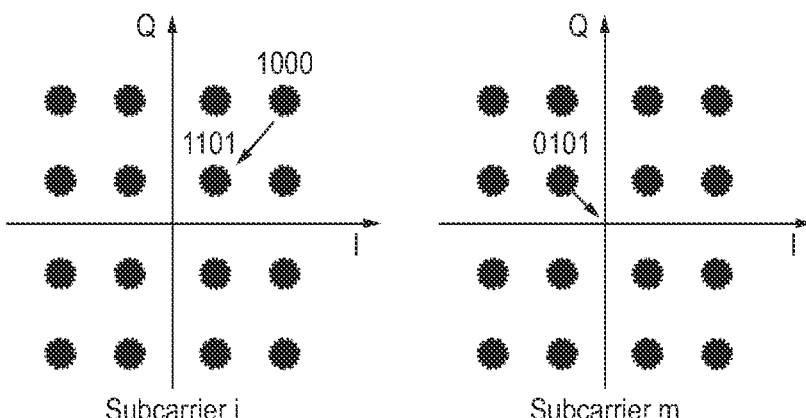
FIG. 2 shows a number of OFDM symbols modulated on different subcarriers, as known in the prior art.

An example of this is shown in FIG. 2 where the data modulated on subcarrier i is 1000 while the data modulated on subcarrier m is 0101. When the tag transforms the signal on subcarrier i from 1000 to 1101 by reducing the signal amplitude, the tag applies the same operation on subcarrier m, reducing the strength of the signal that represents 0101. As a result, the tag creates an invalid codeword on subcarrier m. Therefore, when a tag does codeword translation, it looks for a signal characteristics, such as amplitude, phase, or frequency, to perform signal modification/translation such that the modified signal remains a valid codeword.

Backscatter of OFDM Symbols

Equation 3 below shows an OFDM modulated signal where $\{X_k\}$ are the data symbols modulated on subcarriers, N is the number of sub-carriers, and T is the OFDM symbol time. For 802.11g/n standard, an OFDM symbol lasts for 4 μs and contains 64 subcarriers. The data symbols $\{X_K\}$ are generated using BPSK, QPSK, 16-QAM, or 64-QAM modulation depending on the WiFi standard bit rate.

$$S(t) = \sum_{k=0}^{N-1} X_k e^{\frac{2\pi kt}{T}} \qquad (3)$$

When backscattering an OFDM symbol, a tag, in accordance with one embodiment of the present invention, does not modify the amplitude or frequency of the excitation OFDM signal because such modification creates an invalid codeword in the backscattered signal. Therefore, the tag modifies only the phase of the backscattered signal. A binary example is shown in equation 4 below. The tag introduces a phase offset $\Delta\theta$ to transmit a data one. It introduces no offset to transmit a data zero. The value of $\Delta\theta$ depends on the tag bit rate. For example, if the tag transmits a lower data rate, it uses the binary scheme where $\Delta\theta$ is 180°. If the tag decides to transmit at higher data rate, it may choose $\Delta\theta$ as 90° and use equation 5, shown below, to encode its information.

$$B(t) = \begin{cases} S(t)e^{j0} & \text{Tag data 0} \\ S(t)e^{j\Delta\theta} & \text{Tag data 1} \end{cases} \qquad (4)$$

$$B(t) = \begin{cases} S(t)e^{j0} & \text{Tag data 00} \\ S(t)e^{j\Delta\theta} & \text{Tag data 01} \\ S(t)e^{j2\Delta\theta} & \text{Tag data 10} \\ S(t)e^{j3\Delta\theta} & \text{Tag data 11} \end{cases} \qquad (5)$$

Backscatter with ZigBee

A ZigBee radio uses Offset QPSK (OQPSK) modulation. Similar to QPSK modulation, the data is encoded in the phase of the transmitted signal. Therefore, a tag, in accordance with embodiments of the present invention, embeds data in an OQPSK signal by modifying the phase during reflection. When the tag transmits a data one, it introduces a $\Delta\theta$ phase offset on the reflected signal. When the tag transmits a data zero, it does not change the phase. The formula for embedding tag bits in ZigBee is the same for an 802.11g/n WiFi standards shown in equations 4 and equation 5 above.

Backscatter with Bluetooth.

A Bluetooth radio modulates information by changing the carrier signal frequency between two frequencies $f_1$ and $f_0$ depending on the codeword transmitted. To transmit a data one, the radio sends a sine wave with frequency $f_1$. To transmit a data zero, the radio sends a sine wave with frequency $f_0$. A tag, in accordance with the present invention, uses the formula shown in expression (6) below to embed its information. When transmitting data one, the tag generates an additional frequency offset $\Delta f$ in the backscattered signal by toggling its RF transistor at frequency $\Delta f$. When transmitting data zero, the tag does not generate the additional frequency offset. If we select $\Delta f$ carefully, we can ensure that B(t) is still a valid Bluetooth signal and can be decoded by a commercial Bluetooth radio $$B(t) = S(t)T(t) = \begin{cases} S(t)e^{j(2\pi\Delta ft)} & \text{tag data one} \\ S(t) & \text{tag data zero} \end{cases} \qquad (6)$$

One possible option to ensure that the B(t) remains a valid Bluetooth signal is to select $\Delta f$ to be defined by $|f_1 - f_0|$. Assume that the Bluetooth radio transmits a data one with frequency $f_1$. For the tag to transmit data one, it shift the signal by $\Delta f$ so that the backscattered codeword is$e^{j(2\pi_0 t + \theta_s)}$. This is a valid Bluetooth FSK code word because it is a sine wave with frequency $f_0$. However, a commercial Bluetooth radio will decode it as a zero rather than a one. Conversely, to encode a data zero the tag does not frequency-shift the Bluetooth signal. The case is symmetric when the Bluetooth radio transmits data zero with frequency $f_0$ instead. Therefore, to transmit a data one, a tag, in accordance with one embodiment of the present invention, transforms a Bluetooth codeword with frequency $f_1$ to a backscattered codeword with frequency $f_0$, and transforms a Bluetooth codeword with frequency $f_0$ to a backscattered codeword with frequency $f_1$. To transmit a data zero, the tag generates a backscattered codeword with the same frequency as the original Bluetooth codeword. Therefore, by selecting $\Delta f$ as described above, a tag, in accordance with one embodiment of the present invention, generates a backscattered signal that is a valid Bluetooth signal while embedding the data it seeks to transmit.

Avoiding Interference from Active Radios

If a tag transmits a backscatter signal to a receiver, the receiver may see severe interference from the excitation signal because both the backscattered signal and the excitation signal share the same channel. To avoid such interference, a tag, in accordance with embodiments of the present invention, shifts the frequency of the backscatter signal to ensure that it occupies a frequency channel different from the one occupied by the excitation signal. Such frequency shifting techniques are described, for example, in a paper entitled "Enabling practical backscatter communication for on-body sensors", authored by Pengyu Zhang, Mohammad Rostami, Pan Hu, and Deepak Ganesan, Proceedings of the 2016 conference on ACM SIGCOMM 2016, pp. 370-383, or in a paper entitled "Inter-Technology Backscatter: Towards Internet Connectivity for Implanted Devices", authored by Vikram Iyer, Vamsi Talla, Bryce Kellogg, Shyamnath Gollakota, and Joshua Smith, Proceedings of the 2016 conference on ACM SIGCOMM 2016, pp. 356-369.

Such frequency shifting may be achieved, for example, by toggling the RF transistor at the desired frequency offset. For example, if to shift the backscattered signal 20 MHz away from the excitation signal, the RF transistor is toggled at 20 MHz. In one example, when backscattering a WiFi signal, the tag shifts the frequency such that the backscattered signal is tuned to, for example, channel 13, which is the least used channel in the 2.4 GHz ISM band. Such channel allocation reduces interference to and from other active radios. When backscattering Bluetooth or ZigBee, the tag shifts the frequency of the backscatter signals so that they are tuned to channels close to 2.48 GHz because these channels experience less interference from the WiFi signal.

MAC Protocol

To facilitate effective sharing of the wireless medium between multiple tags, a media access (MAC) scheme is developed in accordance with embodiments of the present invention. The MAC protocol serves two purposes, namely it informs the tag what signals to backscatter with, and further it provides support for multiple tags, as described further below.

Coordinating Tags

Determining when to backscatter is important. If the incorrect signal is backscattered, data cannot be recovered. The tags need a way to distinguish when to start backscattering signals. To ensure that the tag starts to backscatter at the appropriate time, the transmitter (e.g., transmitter 10 in FIG. 1) sends a preamble containing a predetermined sequence of 0s and 1s, described further below. The tag maintains a circular buffer of received bits. If the beginning of the buffer matches the preamble, the tag knows that the buffer contains backscatter data initiated by a command from the transmitter and not random packets.

Communicating with Multiple Tags

Because a tag does not have sufficient power to perform carrier sensing, a random access scheme based on Framed Slotted Aloha protocol is used. In accordance with this protocol, the transmitter acts as a central coordinator, in the same manner as described in the publication "An empirical study of UHF RFID performance" by Michael Buettner and David Wetherall, Proceedings of the 14th ACM international conference on Mobile computing and networking, 2008, pp. 223-234. Communication is carried out in rounds with a fixed number of slots per round. In each round, the tags choose a random slot to transmit. If two tags choose the same slot, collision occurs and data is not successfully transmitted. At the end of a round, the transmitter processes data from the tags and adjusts the number of slots before proceeding to the next round.

Compared to a stochastically allocated time-division scheme, random access allows the number of tags to grow and shrink without a specific association process. The number of slots is inferred by the receiver from the number of packets it receives, as well as the number of possible collisions. The receiver passes this information to the transmitter (e.g., transmitter 10 in FIG. 1). If the transmitter sees many collisions, it increases the number of slots. If the number of collisions fall below a predefined number, the transmitter decreases the number of slots. To avoid collisions from other users on the same channel, the transmitter, such as a transmitter 10 shown in FIG. 1, uses carrier sensing before sending messages to the tags. Each round can have an arbitrary amount of delay before the next. This ensures that the backscatter system does not hog the channel. The use of rounds allows for fairness between the backscatter system and other users of the channel. The use of slots within the backscatter system allows for fairness between tags.

Figure 3:
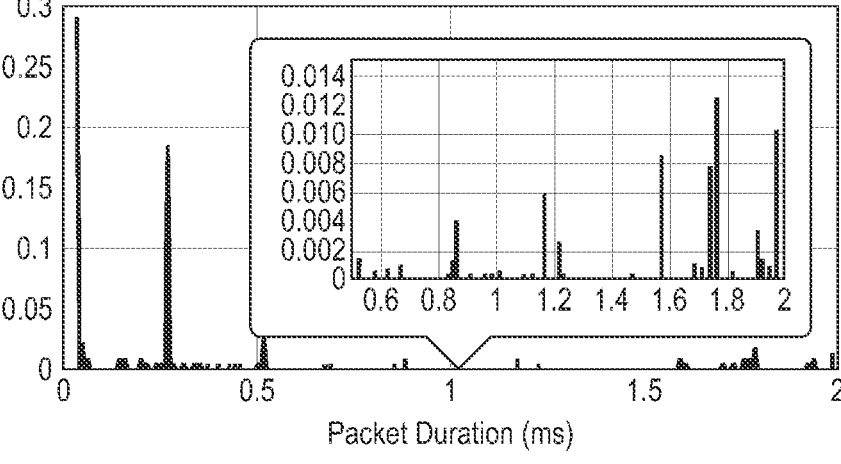
FIG. 3 shows the durations of a number of packets collected on a channel.

FIG. 3 shows the durations of 30 million packets on channel 6 collected in a lecture hall. In the bimodal distribution seen in FIG. 3, nearly 78% of packets last less than 500 μs and nearly 18% of the packets last 1500 μs-2700 μs. With a pulse-width error bound of 25 μs, the probability of an ambient packet having the same length as packets in accordance with one embodiment of the present invention is about 0.03%.

Transmitting Coordination Messages to Tags

In accordance with one aspect of the present invention, the communication from the transmitter to the tags is performed using a technique that consumes relatively low power and dispenses with the need for the tag to decode packets. To achieve this, in one embodiment, an envelope detector is used to enable communication between the transmitter and the tag. Low-power envelope detectors typically consumes less than 1 μW. Such an envelope detector is configured to measure parameters that can be easily measured and modulated at the transmitter using, for example, commodity hardware, as described further below.

Packet Length Modulation

In accordance with one embodiment of the present invention, packet length modulation (PLM) is used to establish communication from the transmitter to the tags. Packet duration is relatively easy for the transmitter to control, works well at a range of distances, and is robust in the presence of ambient network traffic. In the PLM scheme used in accordance with one embodiment of the present invention, a 0 bit is represented by packets of duration $L_0$ and a 1 bit is represented by packet of duration $L_1$. To control the length of the packet, the transmitter sends packets of pre-defined durations $L_0$ and $L_1$. The tag uses an envelope detector to identify the presence and duration of a packet. If a packet duration equals $L_0$ or $L_1$ (within a predefined error range) a bit is recorded to a data buffer. If a packet has a duration different than $L_0$ or $L_1$ (taking into account the predefined range) the packet is treated as noise and discarded, thereby enabling the bits to be received successfully in the presence of other transmissions.

In one embodiment, a backscatter tag, in accordance with the present invention, operating using a WiFi 802.11g/n standard operates at approximately 500 bps, which is sufficient for operating the MAC layer.

To send the scheduling messages, the transmitter may generate dummy packets. Alternatively, the transmitter may buffer existing traffic before sending it to the network interface card (NIC), and then reorder or repacketize to form the sequence of $L_0$ and $L_1$s. Therefore, as long as the network is busy, the backscatter messages imposes negligible overhead on the rest of the channel.

Figure 4:
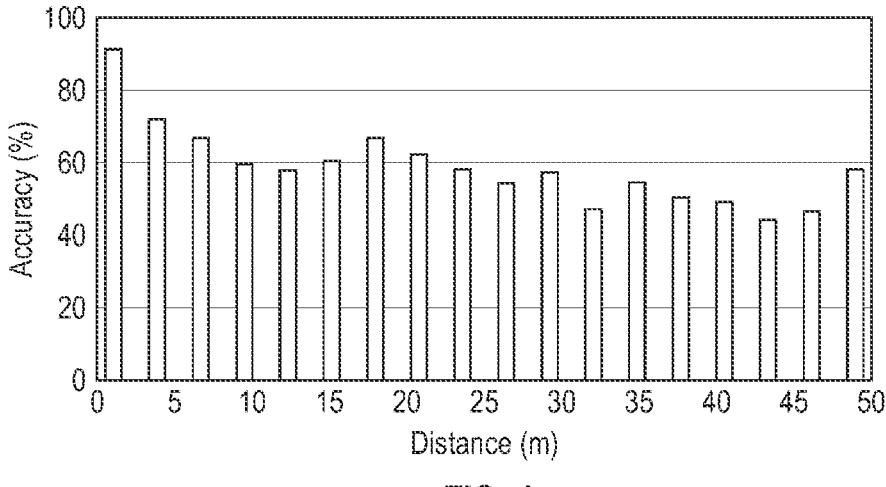
FIG. 4 shows the rate of decoding success as a function of distance, in accordance with one exemplary embodiment of the present invention.

FIG. 4 shows the rate of decoding success as a function of distance. The experiment associated with FIG. 4 was performed in a long hallway inside an office building. For a reference voltage of 1.8 v, the system is seen as being able to successfully decode the scheduling messages with over 70% accuracy when the tag is less than 4 m away from the transmitter. The system is seen as successfully decoding the preamble with about 50% a distance of 50 m. Due to increased SNR, higher accuracy is possible at close proximity by increasing the reference voltage in the comparator. A prototype system was built using off-the-shelf commodity 802.11g/n WiFi, ZigBee, and Bluetooth transceivers and a custom made backscatter tag, as described further below.

Figure 5:
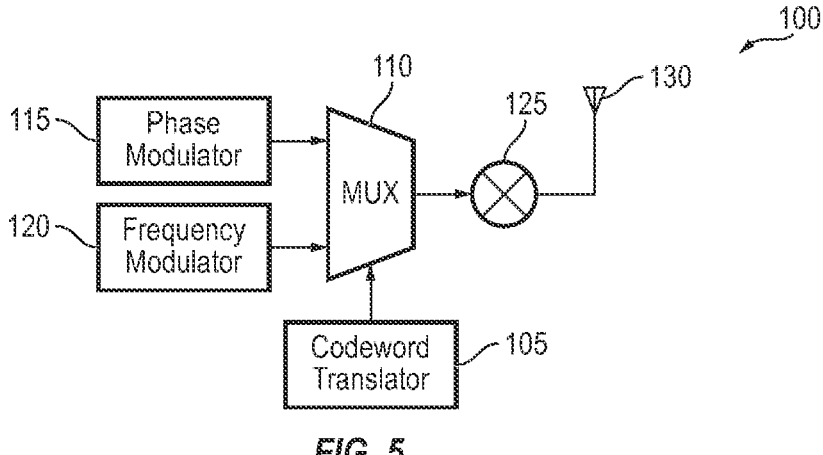
FIG. 5 is a simplified high-level block diagram of a backscatter tag, in accordance with one embodiment of the present invention.

FIG. 5 is a high-level simplified block diagram of a backscatter tag 100, in accordance with one embodiment of the present invention. Backscatter tag 100 is shown as including, in part, a multiplexer 110, a codeword translator 105, a phase modulator 115, a frequency modulator 120, a frequency shifter 125, and an antenna 130. Depending on the type of the data received and the communication protocol used, codeword translator uses the output of either phase modulator 115, or frequency modulator 120. Phase modulator 115 modulates the phase of the received packets and the frequency modulator modulates the frequency of the received packets, as described in detail above. The output of multiplexer 110 is frequency shifted by frequency shifter 125 before being transmitted by antenna 130.

Hardware Platform 802.11g/n transceiver An 802.11g/n receiver disposed in a MacBook Pro laptop with a Broadcom BCM43xx WiFi card that supports 802.11a/b/g/n/ac was used. The WiFi card was placed into a monitor mode to report packets that had incorrect checksums. After receiving the packets, tcpdump (a well-known software) was used to parse the packets and extract the tag bits.

Also an Intel 5300 WiFi card on an Intel NUC was used as the standard 802.11g/n OFDM transmitter, transmitting at 15 dBm. The firmware used was the one described in "Tool release: gathering 802.11n traces with channel state information provided", authored by Daniel Halperin, Wenjun Hu, Anmol Sheth, and David Wetherall, ACM SIGCOMM Computer Communication Review 41, 1 (2011), 53-53.

ZigBee transceiver: A TI CC2650 radio (http://www.ti-.com/product/CC2650) was used as the ZigBee transceiver whose the transmission power was set to 5 dBm, which is the maximum power allowed by this radio. The CC2650 radio development board CC2650EM-7ID supports two types of antennas: a PCB on-board antenna and an antenna with an SMA interface. In the experiment, the VERT2450 antenna was used because it has a wider beam. It was mounted on the SMA interface, as described in "Ettus Research. [n.d.]. VERT2450 Antenna. https://www.ettus.com/product/details/VERT2450.

Bluetooth transceiver: A TI CC2541 radio (http://www.ti-.com/product/CC2541) was used as the Bluetooth transceiver. This radio transmits at 1 Mbps and 0 dBm using FSK modulation with a frequency deviation of 250 kHz and a bandwidth of 1 MHz. The modulation index used is 0.5±0.01.

Tag: The tag used has two VERT2450 antennas: one for reception and one for transmission https://www.ettus.com/product/details/VERT2450. The reception antenna is coupled to an LT5534 envelope detector, which measures when an incoming signal starts. A 0.35 μs delay was measured between the starting point of an excitation signal and the indicator signal from the envelope detector. In other words, 0.35 μs after the arrival of the excitation signal, the envelope detector notifies the processor that the excitation signal has begun. In the evaluations, the performance does not degrade when experiencing a 0.35 μs delay.

The other antenna is controlled by an ADG902 RF switch, which decides when and how to backscatter the excitation signal. The codeword translation module is implemented in a low-power FPGA AGLN250. A power management module was used on the tag which provides 1.5V and 3.3V to the rest of the system. The source code of the tag platform is available at https://github.com/pengyuzhang/FreeRider.

Implementation Challenges

Each radio comes with its own physical layer stack with a specific set of channel codes, interleaving techniques and scrambling algorithms, all of which can interfere with codeword translation and render it ineffective. A description of how to enable codeword translation in the presence of these challenges is provided below.

Challenges in Backscattering OFDM WiFi Signals

Figure 6:
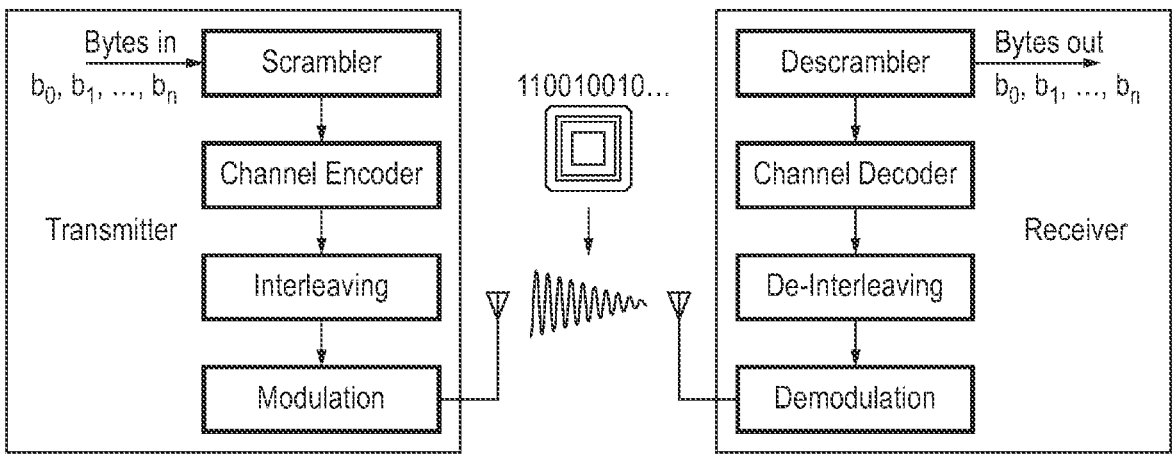
FIG. 6 shows various block diagrams of an 802.11g/n transmission and reception blocks

FIG. 6 shows various block diagrams of an 802.11g/n transmission and reception blocks. There are three factors that could cause difficulty when decoding a backscattered WiFi signal, namely the scrambler, the convolutional channel encoder, and interleaving. The scrambler is a data whitening engine where it takes the input data and XORs it with a pseudorandom sequence. A scrambler ensures that the data transmitted is not all zeros nor all ones, which causes a bad peak-to-average ratio. The channel encoder uses convolutional encoding to improve its robustness over wireless transmission. The interleaving engine re-orders the transmitted bits sequence to ensure that even a bursty error on wireless channel does not cause a burst of continuous errors on the received data. These three modules are described below because they are placed before the modulator in an 802.11g/n transmitter. An explanation as to why such placement could cause unsuccessful backscatter decoding is also described below.

For any input sequence $b_0, b_1 \ldots bn$, the transmitted signal S(t) can be formulated as $S(t) = f(b_0, b_1, \ldots, b_r)$ where f( ) represents the operations introduced by the scrambler, channel encoder, interleaver, and modulator. Since the corresponding demodulator, de interleaver, channel decoder, and descrambler in the receiver provide the reverse operations $f^{-1}( )$ the receiver is able to decode and output the transmitted sequence.

However, when a tag is present and produces a signal g $(b_0, b_1, \ldots, b_r)$ using tag bits $t_0, t_1, \ldots, t_n$, the backscattered signal B(t) becomes the time-domain product between the tag signal and the excitation signal. To help understand this further, the binary case shown in equation 7 below is explained. The signal does not look like it is generated by XORing the excitation signal bits with the tag bits and passed through f( ) Therefore, decoding the tag bits becomes hard.

$$B(t) = S(t)T(t) \qquad (7)$$
$$= f(b_0, b_1, \ldots, b_n) \times g(t_0, t_1, \ldots, t_n)$$
$$!= f(b_0 \oplus t_0, b_1 \oplus t_1, \ldots, b_n \oplus t_n)$$

A possible solution to this problem is redundancy, i.e., map one tag bit to multiple 802.11g/n bits. Instead of directly transmitting $t_0, t_1, \ldots, t_n$ the tag transmits a sequence where a tag repeats each bit multiple times before switching to the next one. The following is a description of the reason why such redundancy helps solve the problem.

The interleaving module is configured to interleave the data assigned to each subcarrier. Interleaving is done per OFDM symbol. In other words, the interleaving module does not interleave data belonging to two OFDM symbols. Therefore, as long as the tag bit duration is longer than an OFDM symbol, the interleaving module will not cause problems.

Figure 7:
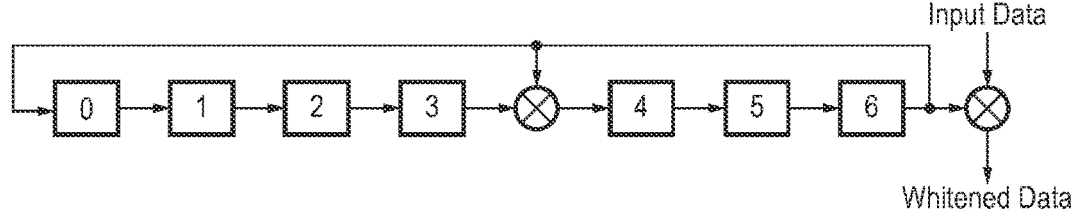
FIG. 7 is a more detailed view of the scrambler shown in FIG. 6.

Both the scramble and channel encoder modules generate and maintain a deterministic structure of the data delivered to the modulator. The scrambler uses the structure shown in FIG. 7 to do data whitening. Even when the input is all zeros, the actual data transmitted is a non-zero sequence. Such data whitening reduces the peak-to-average power ratio in the RF front end. The mathematical expression of the scrambler is shown in equation 8:

$$C[k] = b[k] \oplus b[k-3] \oplus b[k-7] \qquad (8)$$

The channel encoder uses equation 9, shown below, to encode the data at 6 Mbps where b(k) is the input bit $C_1(k)$ and $C_2(k)$ are the codewords generated using a 1/2 coding rate.

$$C_1[k] = b[k] \oplus b[k-2] \oplus b[k-3] \oplus b[k-5] \oplus b[k-6]$$

$$C_2[k] = b[k] \oplus b[k-1] \oplus b[k-2] \oplus b[k-3] \oplus b[k-6] \qquad (9)$$

For other bit rates, the channel encoder is different. The data injected by the tag may corrupt the structures created by the two modules and make backscatter decoding difficult. To overcome these challenges, the two modules were simulated using Matlab and it was found that as long as a tag injects one bit tag data on four OFDM symbols (96 WiFi bits in 6 Mbps data rate), an error bit rate of nearly $1e^{-3}$ may be ontainted. This is because there is a one-to-one mapping between the input sequence b(k) and the output of the two modules C(k) or {$C_1$[k], $C_2$[k]}.

Equation 8 and equation 9 show that the sequence of {b[k]⊕1, b[k−1]⊕1, . . . b[k−7]⊕1} can generate C[k]⊕1 and {$C_1$[k]⊕1, $C_2$[k]⊕1}. Therefore, when the tag does codeword translation and converts C(k) and {$C_1$[k], $C_2$[k]} to C[k]⊕1 and {$C_1$[k]⊕1, $C_2$[k]⊕1}, the corresponding modules at the receiver should output {b[k]⊕1, b[k−1]⊕1, . . . , b[k−7]⊕1}. This result has been proven using empirical Matlab simulation and real system implementation with a MacBook Pro laptop as the backscatter decoder.

The last factor that may impact backscatter decoding is the pilot tone. Pilot tones in an OFDM symbol are used for correcting the phase error. Such phase error correction could remove the additional phase offset introduced by a tag, and render incorrectly decoded tag data. However, there are a number of WiFi chips, such as Broadcom's BCM43xx, that do not use pilot tones for phase error correction and are this able to correctly decode the backscattered tag data.

Challenges in Backscattering ZigBee

ZigBee uses OQPSK modulation where there is a constant time-domain offset (half a bit) between the in-phase signal and the quadrature signal. Such offset is introduced for reducing the signal Peak-to-Average Power Ratio (PAPR) by avoiding the 18 phase transition between neighboring bits. If the tag introduces a 180° phase transition between neighboring bits in the backscattered ZigBee, it may corrupt the OQPSK signal structure and cause trouble decoding.

One solution to this problem is embedding one tag bit to each multiple (N) OQPSK symbols. When a tag transmits data one, instead of introducing the 180° phase offset on a sine OQPSK symbol, the tag introduces the same 180° additional phase offset on N OQPSK symbols. The first tag-modified OQPSK symbol might be incorrectly decoded by a commercial ZigBee decoder because of the potential OQPSK signal structure violation described above. However, the following N−1 tag-modified OQPSK symbols can be correctly decoded because the structure of OQPSK signals is maintained. Therefore, as long as a relatively large N is selected, the data information may be embedded in ZigBee traffic. In one example, N was selected to have a value of 8.

Challenges in Backscattering Bluetooth.

Figure 8:
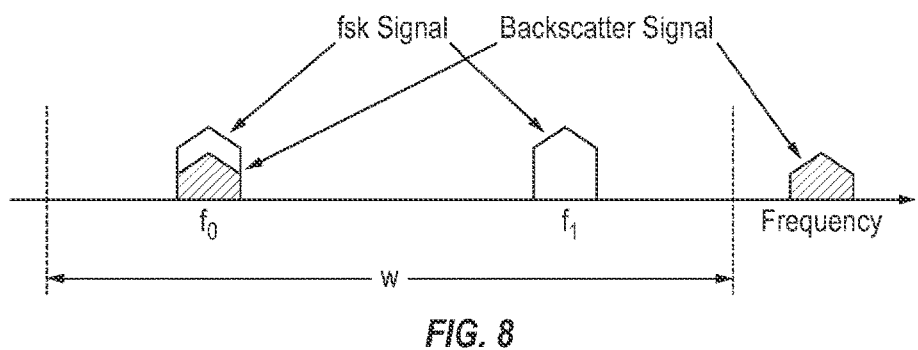
FIG. 8 shows the frequency spectrum of a backscattered Bluetooth signal.

There are two challenges to overcome in decoding a backscattered Bluetooth signal, namely modulation index i, and channel bandwidth w. Modulation index i is defined as $$\frac{f_1 - f_0}{w}$$

and represents the ratio between the frequency deviation of an FSK signal and the bandwidth it occupies. A commercial Bluetooth radio usually uses a modulation index 0.5. When a tag, in accordance with embodiments of the present invention, toggles its RF transistor at Δf, while generating the desired backscattered signal, the tag also generates an undesired signal on the other side of the spectrum as shown in FIG. 8. This undesired signal is generated because the backscattered signal is the time-domain product between the Bluetooth signal and the tag signal. Therefore a double-sideband backscatter signal is generated.

In accordance with one embodiment of the present invention, the undesired backscattered signal is eliminated by taking advantage of the fact that a Bluetooth radio treats signals outside of a channel as interference and is able to eliminate them. Therefore, the selection of Δf needs to satisfy the following two conditions to ensure that the undesired signal remains outside of the backscatter channel and is thus eliminated:

$$\begin{cases} f_1 + \Delta f > f_1 + (1 - i)\frac{w}{2} & \text{FSK radio data one} \\ f_0 - \Delta f < f_0 + (1 - i)\frac{w}{2} & \text{FSK radio data zone} \end{cases} \tag{10}$$

Low-Power Tag Design

To achieve low power consumption, a tag, in accordance with embodiments of the present invention uses a ring oscillator to generate the square wave signals needed for achieving the frequency shifting. One such design is described in the article "Enabling practical backscatter communication for on-body sensors", authored by Pengyu Zhang, Mohammad Rostami, Pan Hu, and Deepak Ganesan, proceedings of the conference on ACM SIGCOMM 2016, pp. 370-383. In one specific prototype formed using a 65 nm technology node, the overall power consumption of the tag is nearly 30 μW depending on the excitation signal. Most of the power (e.g., 19 μW) is consumed by generating the 20 MHz clock needed for frequency shifting. It was determined that 12 μW was used for operating the RF switch and 1-3 μW was used for running the control logic which determines the type of the codeword translator to run.

Experimental Setup

Figure 9A:
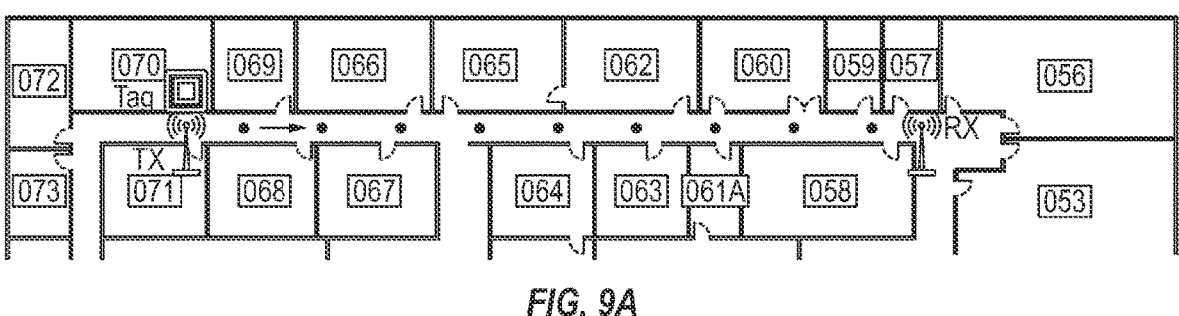
FIG. 9A shows an experimental setup for testing a backscatter tag deployed in a line-of-sight, in accordance with one embodiment of the present invention.
Figure 9B:
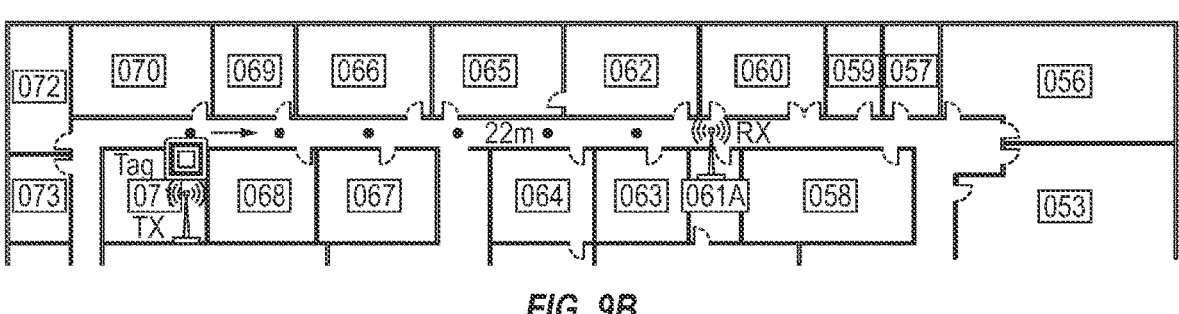
FIG. 9B shows an experimental setup for testing a backscatter deployed in a non-line-of sight setup, in accordance with one embodiment of the present invention.

FIGS. 9A and 9B respectively show experiments for testing a tag's performance when the tag is deployed in a line-of-sight (LOS) and non-line-of sight (NLOS) setup. The tag was positioned 1 m away from the transmitter (802.11g/n WiFi, ZigBee, or Bluetooth). No hardware modifications were performed on the commodity radio transmitters. The receiver was then moved away from the tag as the tag's throughput, bit error rate (BER), and received signal strength indicator (RSSI) were measured. In the LOS experiments, all devices are placed in a hallway. In the NLOS experiments, the transmitter and the tag are deployed in a room while the receiver is deployed in a hallway. In the NLOS deployment, the backscattered signal passes through multiple walls.

Tag's Backscatter Performance with 802.11g/n WiFi Deployed in LOS

Figure 10A:
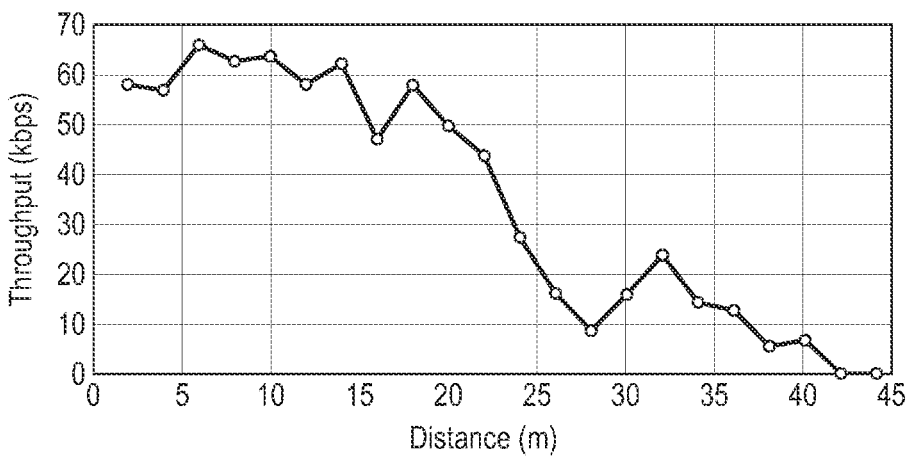
FIG. 10A shows the throughput of a tag, in accordance with one embodiment of the present invention, as a function of distance between the tag and the receiver in a LOS deployment.

FIG. 10A shows the throughput of a tag, in accordance with one embodiment of the present invention, as a function of distance between the tag and the receiver in a LOS deployment. The 802.11g/n WiFi transmitter sends its OFDM signal at 11 dBm. It is seen that the receiver remains able to decode the backscattered signal at a distance of 42 m. This distance is 1.4 times longer than the maximum distance reported in "Passive WiFi: bringing low power to Wi-Fi transmissions", authored by Bryce Kellogg, Vamsi Talla, Shyamnath Gollakota, and Joshua R Smith, 2016, 13th USENIX Symposium on Networked Systems Design and Implementation (NSDI 16) 151-164; and 8.4 times longer than the maximum distance achieved by FS-Backscatter, as reported in "Enabling practical backscatter communication for on-body sensors", authored by Pengyu Zhang, Moham-mad Rostami, Pan Hu, and Deepak Ganesan, Proceedings of the 2016 conference on ACM SIGCOMM. Such long com-munication distance is sufficient for many Internet-of-Things applications.

Figure 10B:
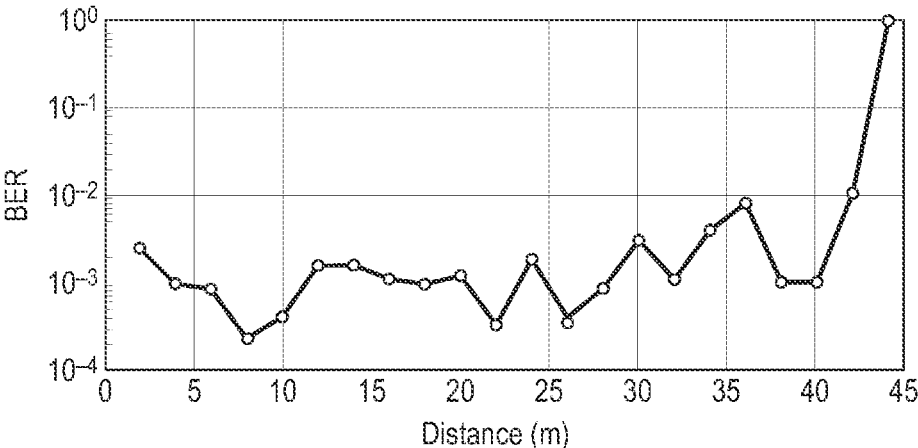
FIG. 10B shows the bit-error rate of a tag, in accordance with one embodiment of the present invention, as a function of distance between the tag and the receiver in a LOS deployment.
Figure 10C:
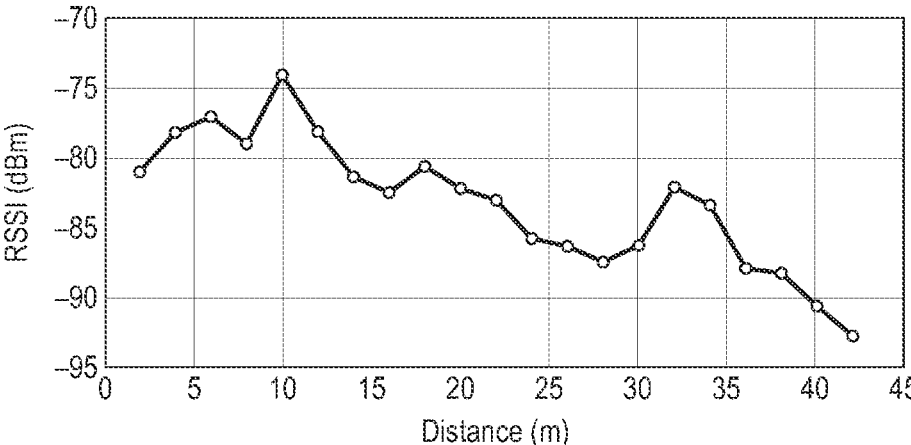
FIG. 10C shows the received signal strength indicator of a tag, in accordance with one embodiment of the present invention, as a function of distance between the tag and the receiver in a LOS deployment.

A tag, in accordance with one embodiment of the present invention, achieves nearly 60 kbps data rate when the receiver is less than 18 m away from the tag. When the receiver moves farther within nearly 26 m-36 m from the tag, the throughput decreases to nearly 15 kbps. This is a relatively lower data rate because OFDM symbols are longer in duration than DSSS symbols. It is seen that the bit error rate remains low even at longer distances as shown in FIG. 10B despite the fact that RSSI does degrade across distance as shown in FIG. 10C. For example, a bit error rate of $1e^{-3}$ is achived when the receiver is positioned 40 m away from the tag. Accordingly, at longer distances, if a backscattered packet reaches the receiver, then it is very likely that the tag will be able to extract the bits with low BER. If the header itself is not decoded, then packet loss increases and through-put is degraded.

Tag's Backscatter Performance with 802.11g/n WiFi deployed in NLOS

Figure 11A:
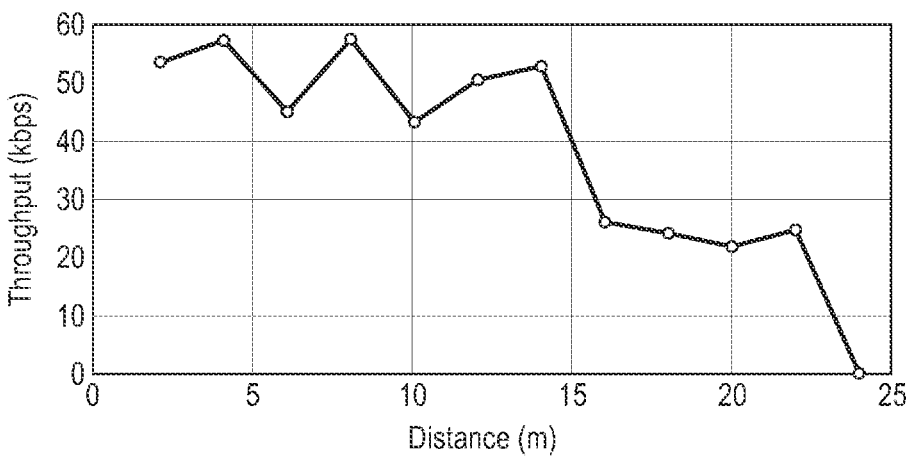
FIG. 11A shows the throughput of a tag, in accordance with one embodiment of the present invention, as a function of distance between the tag and the receiver in an NLOS deployment.
Figure 11B:
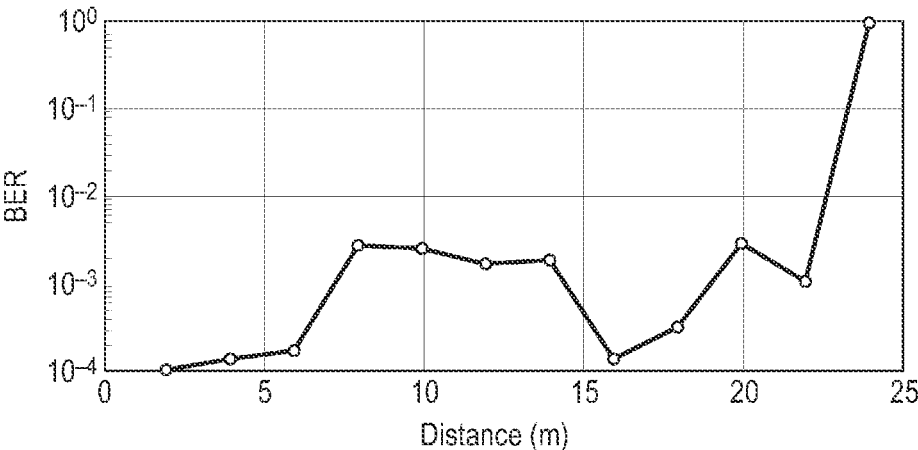
FIG. 11B shows the bit-error rate of a tag, in accordance with one embodiment of the present invention, as a function of distance between the tag and the receiver in an NLOS deployment.
Figure 11C:
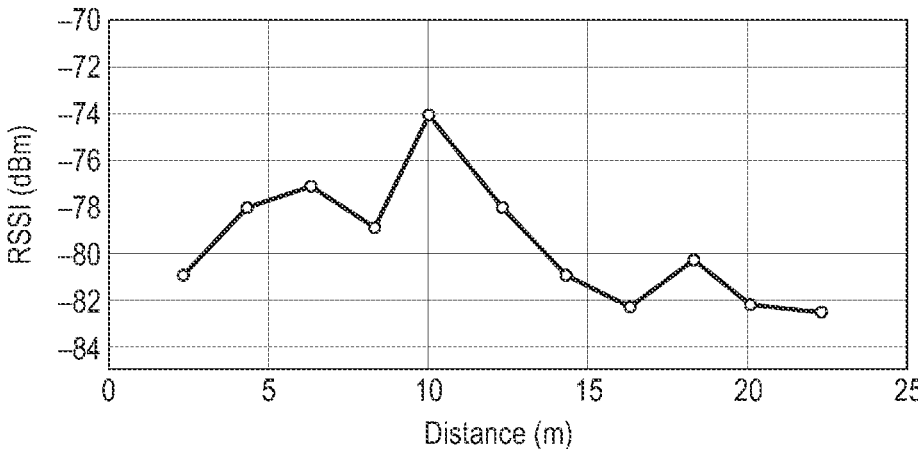
FIG. 11C shows the received signal strength indicator of a tag, in accordance with one embodiment of the present invention, as a function of distance between the tag and the receiver in an NLOS deployment.

In the NLOS experiment, the 802.11g/n transmitter and the tag were placed in a room while the receiver was moved away in a hallway. FIG. 11A shows the throughput of the system in this setup. The receiver is able to receive the backscattered packets when it is 22 m away from the tag. Similar to the LOS deployment, a data rate of nearly 60 kbps is achieved when the receiver is less than 14 m away from the tag. At longer distances, the backscatter throughput degrades to nearly 20 kbps. FIG. 11B shows the BER of the system in the NLOS deployment. Similar to the LOS deployment, a low BER is achieved across various dis-tances. However, backscatter communication appears to stop at 22 m even though an RSSI of −84 dBm is achieved at 22 m as shown in FIG. 11C. It is seen that when the receiver is more than 22 m away from the tag, the backs-cattered signal needs to pass one more wall before reaching the receiver as shown in FIG. 9B. As a result, the signal becomes too weak and the packet header is not detected.

Backscatter with ZigBee

Figure 12A:
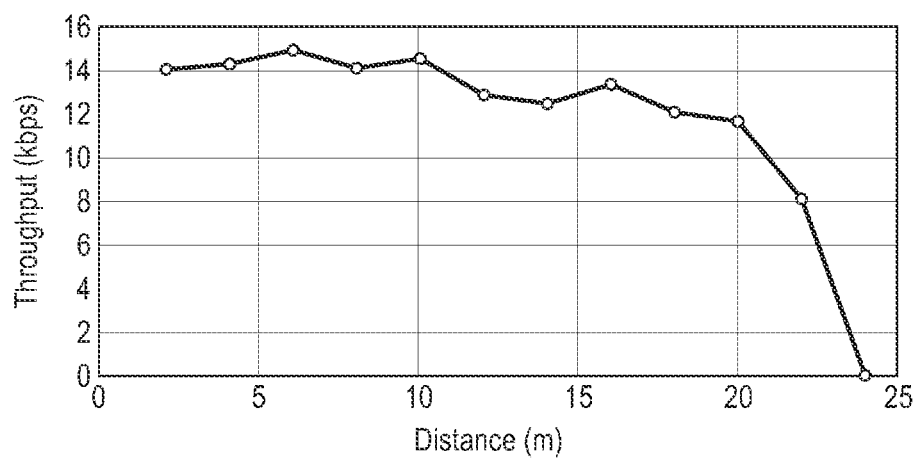
FIG. 12A shows the throughput of a tag, in accordance with one embodiment of the present invention, as a function of distance between the tag and a ZigBee receiver.
Figure 12B:
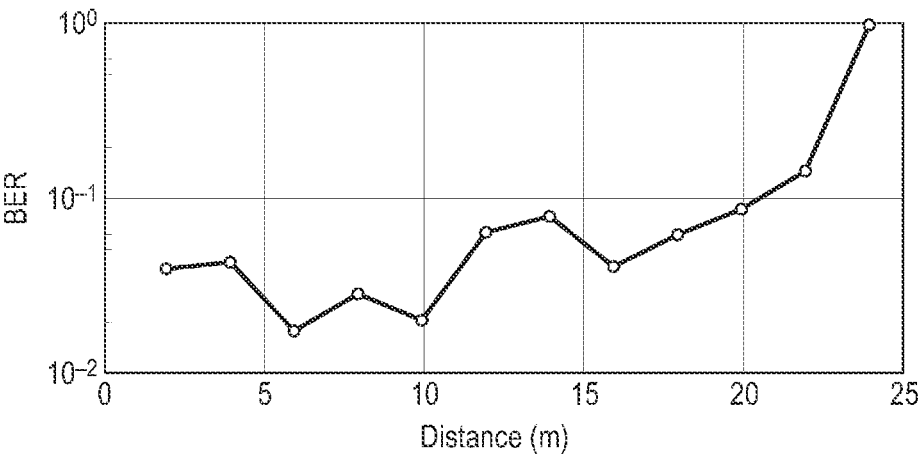
FIG. 12B shows the bit-error rate of a tag, in accordance with one embodiment of the present invention, as a function of distance between the tag and a ZigBee receiver.
Figure 12C:
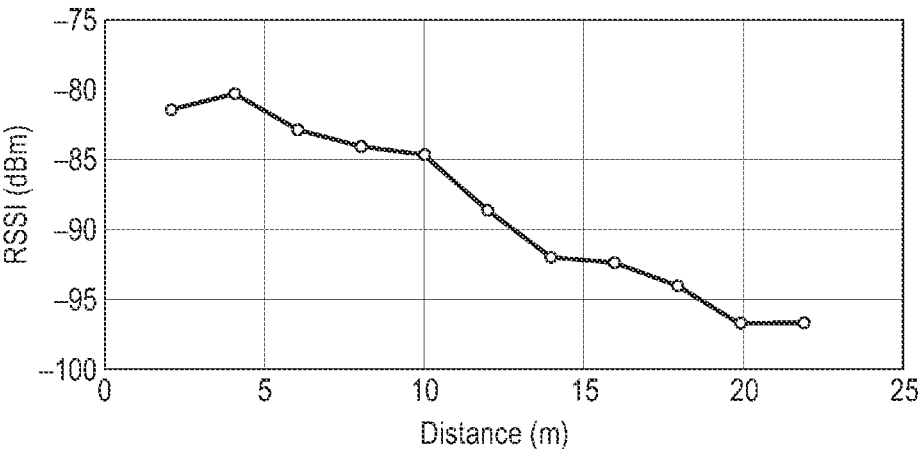
FIG. 12C shows the received signal strength indicator of a tag, in accordance with one embodiment of the present invention, as a function of distance between the tag and a ZigBee receiver.

FIG. 12A shows the throughput of a tag, in accordance with one embodiment of the present invention, as a ZigBee receiver moves away from the tag. The receiver receives backscattered packets from nearly 22 m away. FIG. 12B shows the BER (bit error rate) of a tag, in accordance with one embodiment of the present invention, as a ZigBee receiver moves away from the tag. FIG. 12C shows that the received signal strength degrades to −97 dBm at 22 m, which is close to the noise floor of the ZigBee radio. Therefore, receiving the backscattered packets at longer distances becomes challenging. A backscatter data rate of nearly 14 kbps is achieved when the receiver is less than 12 m away from the tag. At farther distances, the throughput degradation is not severe. A data rate of 12 kbps is achieved at a distance of 20 m. The bit error rate achieved is nearly $5e^{-2}$ across all distances, higher than the case when the excitation signal is 802.11g/n.

Backscatter with Bluetooth

Figure 13A:
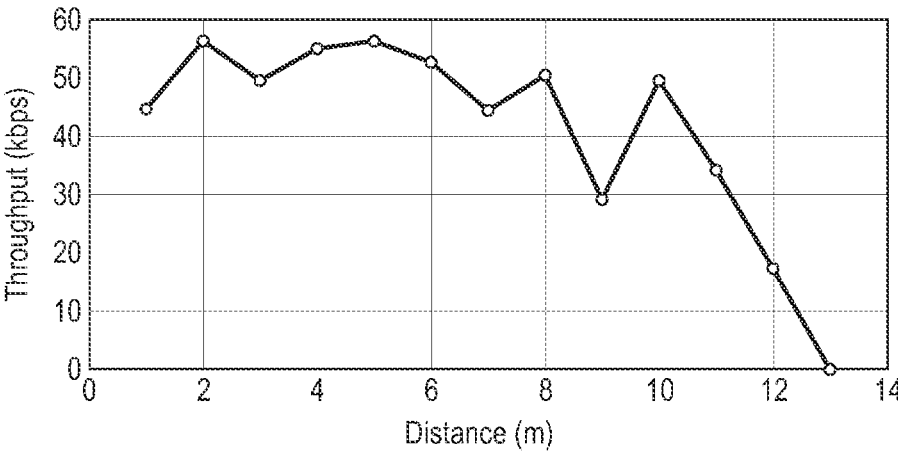
FIG. 13A shows the throughput of a tag, in accordance with one embodiment of the present invention, as a function of distance between the tag and a Bluetooth receiver.
Figure 13B:
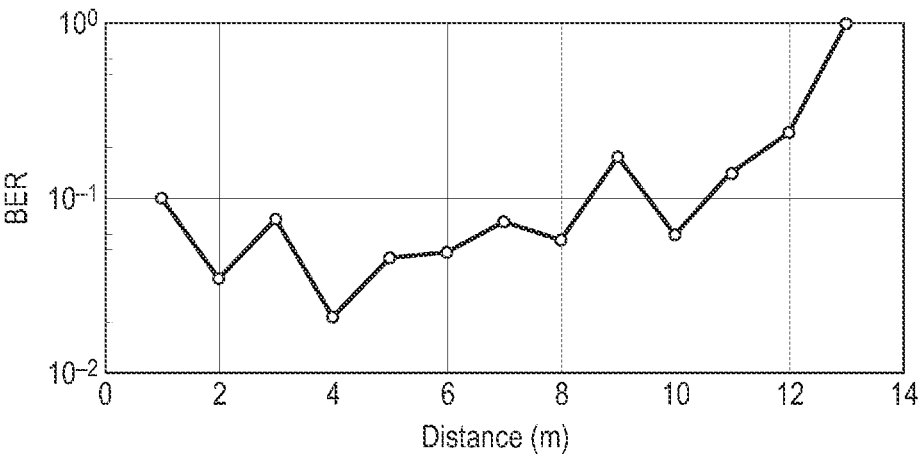
FIG. 13B shows the bit-error rate of a tag, in accordance with one embodiment of the present invention, as a function of distance between the tag and a Bluetooth receiver.
Figure 13C:
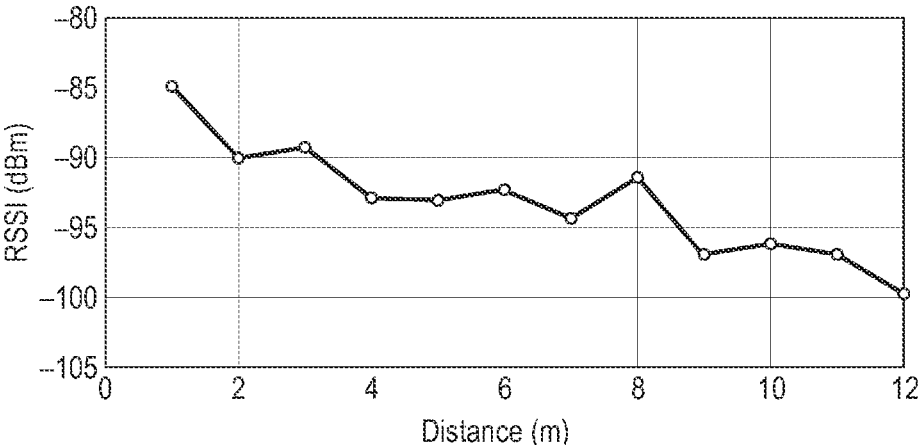
FIG. 13C shows the received signal strength indicator of a tag, in accordance with one embodiment of the present invention, as a function of distance between the tag and a Bluetooth receiver.

FIG. 13A shows the throughput of a tag, in accordance with one embodiment of the present invention, as a Blu-etooth receiver moves away from the tag. It is seen that the receiver decodes backscatter packets up to 12 m. FIG. 13B shows the BER of a tag, in accordance with one embodiment of the present invention, as a Bluetooth receiver moves away from the tag. FIG. 13C shows that the backscatter signal has a strength of nearly −100 dBm at 12 m, close to the noise floor. Therefore, decoding the backscattered packets at far-ther distance becomes challenging. When the receiver is less than 10 m away from the tag, a data rate of nearly 50 kbps is achieved. Throughput degrades to 19 kbps at 12 m and the BER increases to 0.23.

Impact of Distance Between Transmitter and Tag

Figure 14:
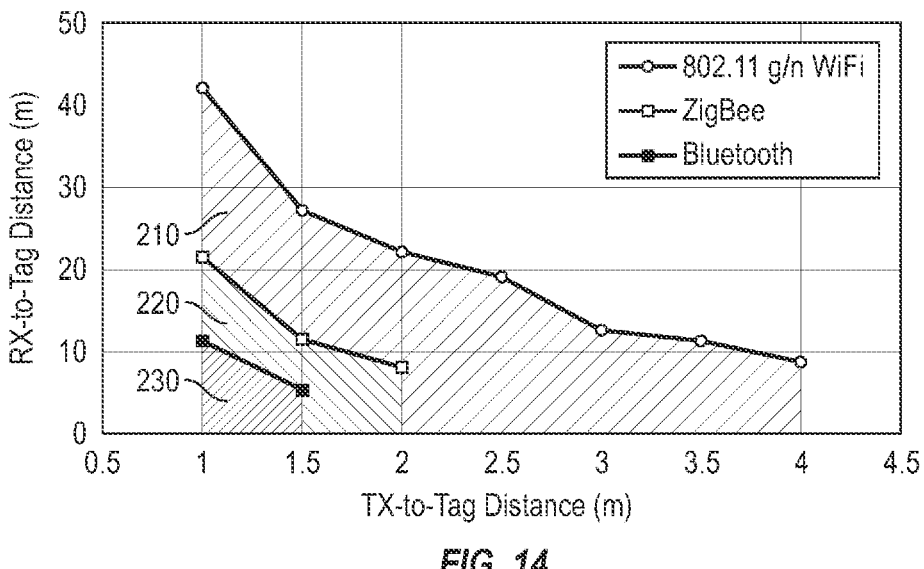
FIG. 14 shows the effect of the distance between the tag, in accordance with embodiments of the present, and the transmitter for WiFi 802.11g/n, ZigbBee and Bluetooth communications protocols, in accordance with one embodiment of the present invention.

To measure this effect, the distance between the tag and the transmitter was varied up to a point where backscatter communication could be sustained. FIG. 14 shows the result of this experiment. When backscattering 802.11g/n signal, at a transmitter-to-tag distance of 4 m, the maximum receiver-to-tag distance is measured as 8 m. This is less than the 42 m achievable when the transmitter-to-tag distance is 1 m. Decreasing the receiver-to-tag communication distance yields a slight increase in the achievable transmitter-to-tag distance. The operational regime of the tag system is shown in the area 210 of FIG. 14.

When a ZigBee or Bluetooth radio is used, both the transmitter-to-tag distance and the receiver-to-tag distance become shorter. The maximum transmitter-to-tag distance is 2 m and 1.5 m for ZigBee and Bluetooth radios respectively, and the corresponding operational regime of tag system is marked with 220 and 230 respectively. Both regimes are smaller than when an 802.11g/n signal is used primarily because the transmission power of the ZigBee and Bluetooth radios is smaller (5 dBm and 0 dBm vs 15 dBm).

Co-Existence with WiFi Networks

To determine if a tag, in accordance with embodiments of the present invention, can co-exist with existing WiFi net-works, WiFi traffic was generated in which a laptop transfers files via WiFi on channel 6 (2.437 GHz). Then, a backscatter was run on nearly 2.472-2.48 GHz (the exact frequency depends on the type of the excitation signal). A measurement was made to determine how the WiFi traffic and backscatter impact each other when the backscatter channel does not conflict with the WiFi channel.

Does Backscatter Impact WiFi

Figure 15:
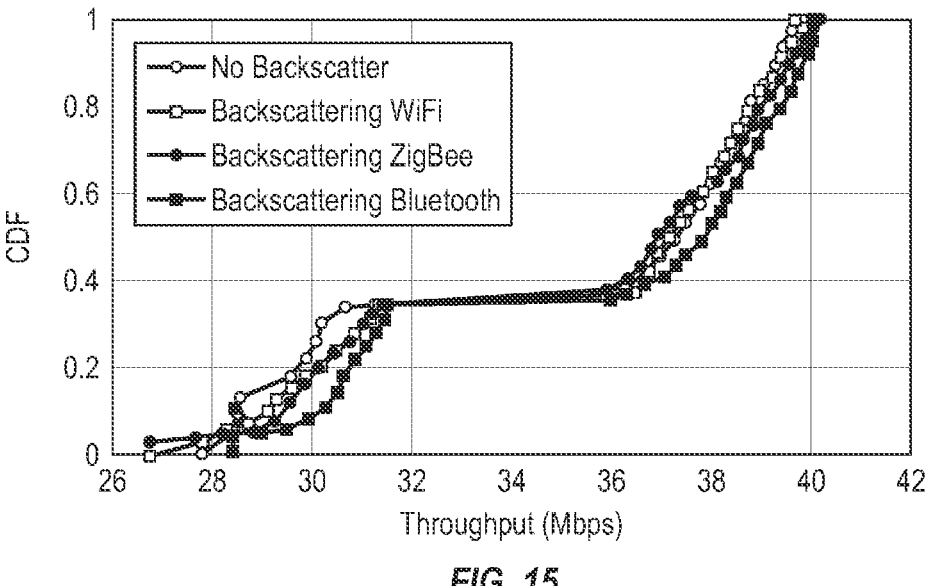
FIG. 15 shows the throughput of a WiFi 802.11g/n when the backscatter tag is either present or absent, in accordance with one embodiment of the present invention.

FIG. 15 shows the WiFi throughput when the backscatter tag is either present or absent. When backscatter is absent, WiFi is able to transmit at nearly 37.4 Mbps median data rate. Then, a backscatter tag is placed 1 m away from the WiFi receiver and the WiFi throughput is measured. The tag runs three codeword translators sequentially, one for back-scattering 802.11g/n WiFi, one for ZigBee, and one for Bluetooth. The median WiFi throughput measured is 37 Mbps, 37.9 Mbps, and 36.8 Mbps respectively, close to the WiFi throughput when the backscatter tag is not present. Therefore, a backscatter tag does not cause interference on an existing WiFi traffic.

Does WiFi Impact Backscatter

To determine whether or not concurrent WiFi traffic impacts backscatter decoding, the following experiment was performed. When a tag backscatters its data in a channel that is occupied by WiFi traffic, backscatter throughput degrades to zero because the WiFi traffic is usually approximately 30 dB higher than the backscattered signal. Therefore, backs-catter suffers. Therefore, an experiment is performed under a condition where an existing WiFi traffic does not share the same channel as backscatter, so as to understand how backscatter performs in the presence of WiFi traffic on adjacent channels.

Figure 16A:
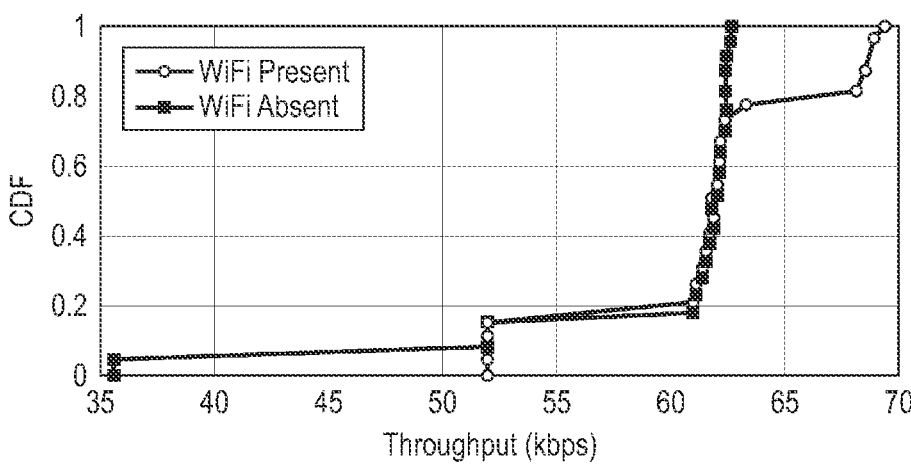
FIG. 16A shows the backscatter tag throughput when an 802.11g/n WiFi is used as the excitation signal for the backscatter tag, in accordance with one embodiment of the present invention.

FIG. 16(A) shows the backscatter throughput when an 802.11g/n WiFi is used as the excitation signal with the tag backscattering on channel 13 (2.472 GHz), and the WiFi traffic running on channel 6 (2.437 GHz). When the WiFi traffic is absent, 61.8 kbps median backscatter throughput is achieved. When the WiFi traffic is present, the backscatter throughput remains at 61.8 kbps. However, it is seen that the backscatter is able to reach 68 kbps for 20% of the time when the WiFi traffic is absent, and degrades to 35 kbps for 10% of the time when the WiFi traffic is present. Therefore, the presence of WiFi traffic impacts the backscatter throughput. To minimize this impact, technique similar to the one described in "Hitchhike: Practical backscatter using commodity WiFi", authored by Pengyu Zhang, Dinesh Bharadia, Kiran Joshi, and Sachin Katti, 2016 ACM SENSYS, may be used together with RTS-CTS to reserve the channel for backscatter.

Figure 16B:
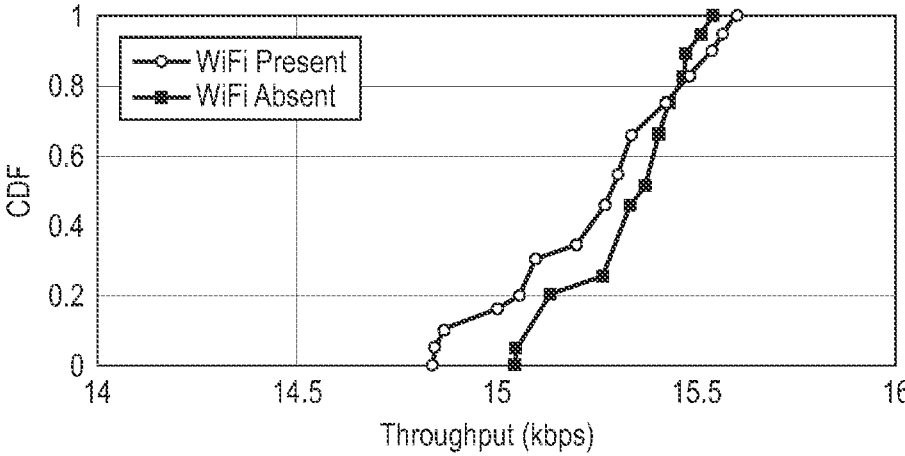
FIG. 16B shows the backscatter tag throughput when a ZigBee is used as the excitation signal for the backscatter tag with the tag, in accordance with one embodiment of the present invention.
Figure 16C:
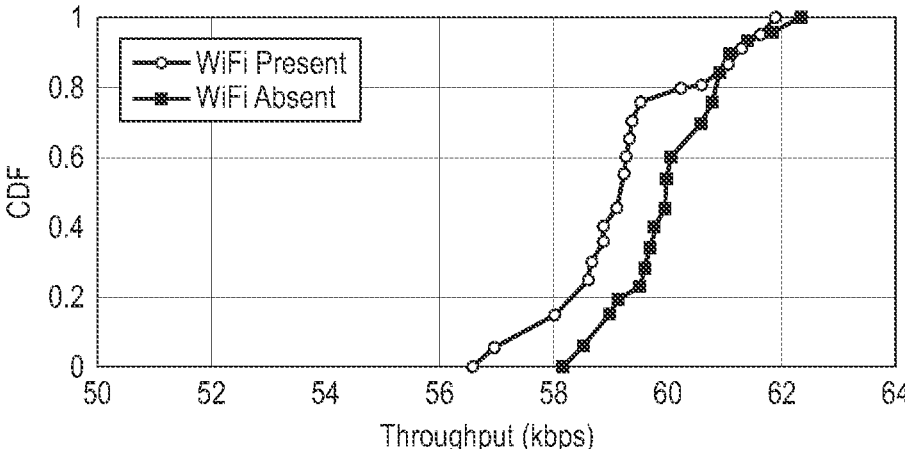
FIG. 16C shows the backscatter tag throughput when a Bluetooth is used as the excitation signal for the backscatter tag with the tag, in accordance with one embodiment of the present invention.

FIGS. 16(B) and 16(*c*) show the backscatter throughput when a tag backscatters a ZigBee signal and a Bluetooth signal respectively. In both experiments, the tag backscatters on channel 2.48 GHz. It is seen that the backscatter throughput difference between WiFi traffic being present or not is only approximately between 1-2 kbps. Therefore, an existing WiFi traffic does not impact the backscatter performance when a ZigBee or Bluetooth radio is leveraged. One reason is that both such radios are narrowband, and therefore, have better performance in filtering out-of-band interference.

Evaluating MAC Layer Performance

Figure 17A:
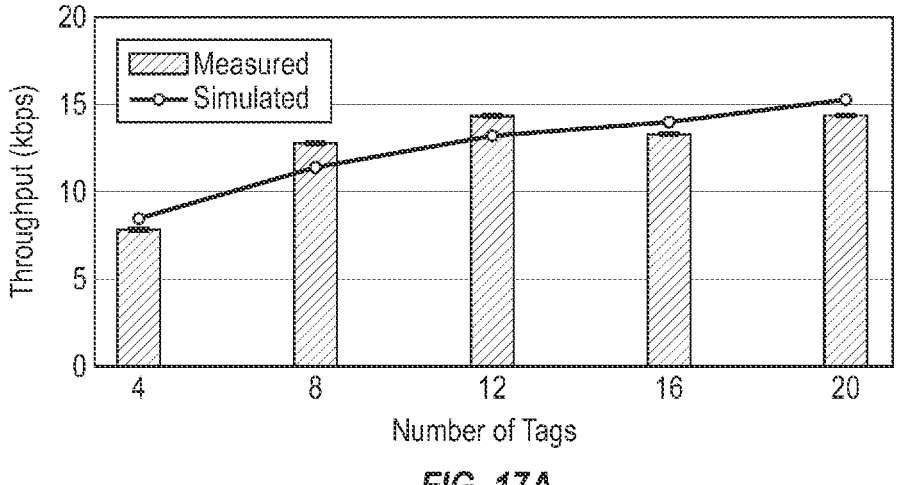
FIG. 17A shows the aggregated throughput when respectively 4, 8, 12, 16, and 20 tags are positioned in the path of the transmitter, in accordance with one embodiment of the present invention.
Figure 17B:
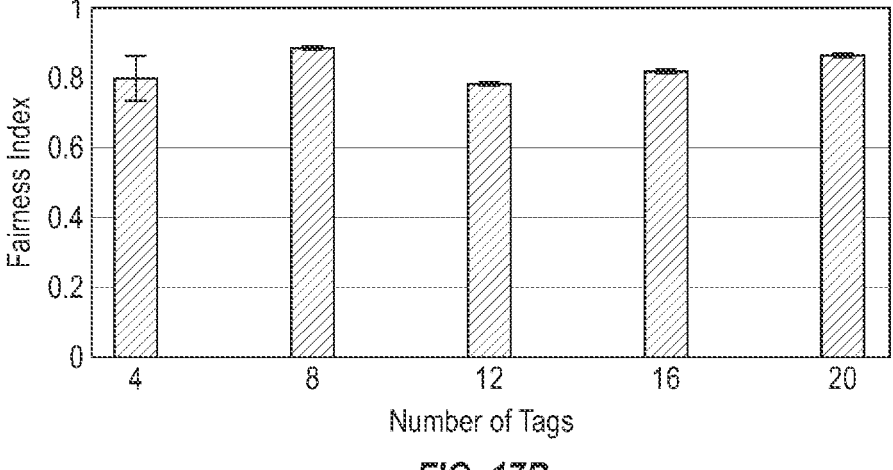
FIG. 17B shows the Jain's fairness index when respectively 4, 8, 12, 16, and 20 tags are positioned in the path of the transmitter, in accordance with one embodiment of the present invention.

The performance of the system when communicating with multiple tags is also studied. FIG. 17(*a*) shows the aggregated throughput when respectively 4, 8, 12, 16, and 20 tags are positioned in the path of the transmitter. The aggregate throughput is lower than that of a single tag for two reasons: control overhead and collisions. As the number of tags increases, the aggregated throughput increases. This is due to the relative ratio of control overhead decreasing when more transmission slots are used. If the simulation is extended beyond the 20 tags, the throughput asymptotically approaches to at about 18 kbps. If there are no collisions (i.e. a TDM scheme), the simulation throughput asymptotically approaches to about 40 kbps.

Framed Slotted Aloha is well-suited to applications that have low data needs and where the number of active tags can increase or decrease without warning, such as inventory tracking. More data-intensive applications would benefit from a time division scheme, which would be possible to implement in a tag, in accordance with embodiments of the present invention. The analysis above was limited to a single MAC layer design.

FIG. 17(*b*) shows the Jain's fairness index, as described in "Throughput fairness index: An explanation", Technical Report, Department of CIS, The Ohio State University authored by Raj Jain, Arjan Durresi, and Gojko Babic, 1999, when 4, 8, 12, 16, and 20 tags are present. When the number of tags increases, the fairness index stays about the same because the scheduler dynamically allocates a larger number of slots when more tags are present. The averaged fairness index is 0.85 when 20 tags are present, suggesting that most of tags still obtain similar opportunities for data transmission.

The above descriptions of embodiments of the present invention are illustrative and not limitative. For example, the various embodiments of the present inventions are not limited by the communication protocol, 802.11g/n, Bluetooth, ZigBee or otherwise, used for signal transmission. Other modifications and variations will be apparent to those skilled in the art and are intended to fall within the scope of the appended claims.

What is claimed is:

1. A backscatter tag communication device, comprising:
a receiver configured to receive a first packet comprising a first plurality of codewords, the first packet conforming to a communication protocol defining a second plurality of codewords inclusive of the first plurality of codewords, and wherein the first packet is characterized by a first frequency:
a codeword translator configured to generate a second packet, for each respective codeword of the first plurality of codewords and based at least in part on data that the backscatter tag communication device is invoked to transmit, by:
selecting a target codeword of the second plurality of codewords; and
translating the respective codeword to the target codeword:
a switch configured to generate a backscatter tag signal defining the second packet by multiplying an excitation signal defining the first packet with the data that the backscatter tag communication device is invoked to transmit, wherein to multiply the excitation signal with the data, the switch is toggled at a desired frequency offset; and
a transmitter configured to transmit the backscatter tag signal.

2. The backscatter tag communication device of claim 1, wherein translating the respective codeword to the target codeword comprises changing a phase of the respective codeword.

3. The backscatter tag communication device of claim 1, wherein the communication protocol comprises one of Bluetooth, ZigBee, WiFi 802.11(g), or WiFi 802.11(n).

4. The backscatter tag communication device of claim 2, wherein the phase is changed based at least in part on a data rate of the transmitter.

5. The backscatter tag communication device of claim 1, wherein said backscatter tag communication device is configured to transmit the second packet during one of a plurality of time slots at random.

6. The backscatter tag communication device of claim 5, wherein a count of the plurality of time slots is a variable number.

7. The backscatter tag communication device of claim 1, wherein the first packet comprises a duration.

8. The backscatter tag communication device of claim 7, further comprising:
an envelope detector configured to detect the duration of the first packet.

9. The backscatter tag communication device of claim 1, wherein the target codeword is different from the respective codeword.

10. The backscatter tag communication device of claim 1, wherein each codeword comprises a plurality of bits.

11. A method of communication via a backscatter tag, the method comprising:
receiving, by a receiver, a first packet comprising a first plurality of codewords, the first packet conforming to a communication protocol defining a second plurality of codewords inclusive of the first plurality of codewords, wherein the first packet is characterized by a first frequency;
generating, by a codeword translator, a second packet, for each respective codeword of the first plurality of codewords and based at least in part on data that the backscatter tag is invoked to transmit, by:
selecting a target codeword of the second plurality of codewords; and
translating the respective codeword to the target codeword;

generating, by a switch, a backscatter tag signal defining the second packet by multiplying an excitation signal defining the first packet with the data that the backscatter tag is invoked to transmit, wherein to multiply the excitation signal with the data, the switch is toggled at a desired frequency offset; and transmitting, by a transmitter, the backscatter tag signal.

12. The method of claim 11, wherein translating the respective codeword to the target codeword comprises changing a phase of the respective codeword.

13. The method of claim 12, wherein the phase is changed based at least in part on a data rate of a transmitter transmitting the second packet.

14. The method of claim 11, wherein the communication protocol comprises one of Bluetooth, ZigBee, WiFi 802.11 (g), or WiFi 802.11(n).

15. The method of claim 11, further comprising:

transmitting the second packet during one of a plurality of time slots at random.

16. The method of claim 15, wherein a count of the plurality of time slots is a variable number.

17. The method of claim 11, wherein the first packet has a duration.

18. The method of claim 17, wherein the backscatter tag comprises an envelope detector configured to detect the duration of the first packet.

* * * * *